United States Patent
Hiramatsu

(10) Patent No.: US 10,229,331 B2
(45) Date of Patent: Mar. 12, 2019

(54) THREE-DIMENSIONAL INFORMATION CALCULATION DEVICE, THREE-DIMENSIONAL INFORMATION CALCULATION METHOD, AND AUTONOMOUS MOBILE DEVICE

(71) Applicant: Hitachi, Ltd., Chiyoda-ku, Tokyo (JP)

(72) Inventor: Yoshitaka Hiramatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 55 days.

(21) Appl. No.: 15/540,840

(22) PCT Filed: Jan. 16, 2015

(86) PCT No.: PCT/JP2015/051076
§ 371 (c)(1),
(2) Date: Jun. 29, 2017

(87) PCT Pub. No.: WO2016/113904
PCT Pub. Date: Jul. 21, 2016

(65) Prior Publication Data
US 2018/0018529 A1    Jan. 18, 2018

(51) Int. Cl.
*G06K 9/00* (2006.01)
*G06T 7/00* (2017.01)
(Continued)

(52) U.S. Cl.
CPC ......... *G06K 9/00805* (2013.01); *B60W 30/09* (2013.01); *B60W 30/0956* (2013.01);
(Continued)

(58) Field of Classification Search
None
See application file for complete search history.

(56) References Cited

U.S. PATENT DOCUMENTS 6,483,429 B1 * 11/2002 Yasui ............... B60Q 9/005
340/435
9,699,432 B2 * 7/2017 Ohba .................. H04N 13/271
(Continued)

FOREIGN PATENT DOCUMENTS

JP    2004-61382 A    2/2004
JP    2008-236642 A   10/2008
(Continued)

OTHER PUBLICATIONS

International Search Report (PCT/ISA/210) issued in PCT Application No. PCT/JP2015/051076 dated Apr. 14, 2015 with English translation (three (3) pages).
(Continued)

*Primary Examiner* — Shervin K Nakhjavan
(74) *Attorney, Agent, or Firm* — Crowell & Moring LLP

(57) ABSTRACT

A three-dimensional information calculation device includes a first image input unit which continuously acquires a plurality of images from a first imaging unit, a second image input unit which continuously acquires a plurality of images from a second imaging unit, an object candidate region extraction unit which extracts an object candidate region where an object exists by using two or more images acquired by the first image input unit at different times, a region future estimation unit which estimates a future position of the object candidate region relative to an image capture range of the first imaging unit based on a position of the extracted object candidate region on a plurality of images, and a three-dimensional information calculation unit which calculates three-dimensional information of the object candidate region, in which three-dimensional information is deemed required based on the future position estimated by the region future estimation unit, based on corresponding points of the object candidate region in an image included in the images
(Continued)

acquired by the first image input unit and an image included in the images acquired by the second image input unit.

15 Claims, 20 Drawing Sheets

(51) Int. Cl.
| | |
|---|---|
| G06T 7/20 | (2017.01) |
| G06T 7/292 | (2017.01) |
| G06T 7/73 | (2017.01) |
| G06T 7/246 | (2017.01) |
| B60W 30/09 | (2012.01) |
| B60W 30/095 | (2012.01) |
| B60W 40/02 | (2006.01) |
| G05D 1/02 | (2006.01) |
| G06K 9/20 | (2006.01) |
| G08G 1/16 | (2006.01) |
| G06K 9/32 | (2006.01) |

(52) U.S. Cl.
CPC ........... *B60W 40/02* (2013.01); *G05D 1/0251* (2013.01); *G06K 9/209* (2013.01); *G06K 9/3233* (2013.01); *G06T 7/00* (2013.01); *G06T 7/20* (2013.01); *G06T 7/248* (2017.01); *G06T 7/292* (2017.01); *G06T 7/74* (2017.01); *G08G 1/165* (2013.01); *G08G 1/166* (2013.01); *B60W 2420/42* (2013.01); *B60W 2550/10* (2013.01); *B60W 2550/20* (2013.01); *G05D 2201/0213* (2013.01); *G06K 2209/21* (2013.01); *G06T 2207/10028* (2013.01); *G06T 2207/30261* (2013.01)

(56) References Cited

U.S. PATENT DOCUMENTS

| | | | | |
|---|---|---|---|---|
| 2005/0100192 A1* | 5/2005 | Fujimura | ........... | G06K 9/00369 382/103 |
| 2007/0276541 A1* | 11/2007 | Sawasaki | ............. | G05D 1/0246 700/253 |
| 2009/0323121 A1* | 12/2009 | Valkenburg | .......... | G01B 11/002 358/1.18 |
| 2010/0246901 A1* | 9/2010 | Yang | ......................... | B60R 1/00 382/107 |
| 2011/0063097 A1* | 3/2011 | Naka | .................. | G06K 9/00798 340/435 |
| 2012/0035788 A1* | 2/2012 | Trepagnier | ............ | B60W 30/00 701/3 |
| 2014/0168440 A1* | 6/2014 | Tsuchiya | ................... | B60R 1/00 348/148 |
| 2014/0180497 A1* | 6/2014 | Kojima | .............. | G06K 9/00798 701/1 |
| 2015/0070347 A1* | 3/2015 | Hofmann | ........... | G06K 9/00208 345/419 |

FOREIGN PATENT DOCUMENTS

| | | |
|---|---|---|
| JP | 2009-294934 A | 12/2009 |
| JP | 2010-286926 A | 12/2010 |
| JP | 2012-216946 A | 11/2012 |
| JP | 2013-20543 A | 1/2013 |
| JP | 2013-142668 A | 7/2013 |

OTHER PUBLICATIONS

Japanese-language Written Opinion (PCT/ISA/237) issued in PCT Application No. PCT/JP2015/051076 dated Apr. 14, 2015 (four (4) pages).

Japanese-language Office Action issued in counterpart Japanese Application No. 2016-569199 dated May 29, 2018 with English translation (six (6) pages).

\* cited by examiner

FIG.5

OBJECT CANDIDATE REGION TABLE 300

| ID | REGION VERTEX COORDINATES | TWO-DIMENSIONAL OF | | EXTRACTION TIME | ESTIMATED STATUS OF TIME te | THREE-DIMENSIONAL INFORMATION CALCULATION | |
|---|---|---|---|---|---|---|---|
| | | | | | | PRIORITY | EXECUTION STATUS |
| 0 | (10,10),(10,20),(20,10),(20,20) | X1,X2 | | tx | (15,15),(15,25),(25,15),(25,25) | 100 | ACTIVE |
| 1 | ⋮ | Y1,Y2,⋯ | | tx+1 | ⋮ | 80 | WAIT |
| ⋮ | ⋮ | ⋮ | | | | ⋮ | ⋮ |

FIG.12

OBJECT CANDIDATE REGION TABLE 300

| ID | REGION VERTEX COORDINATES | TWO-DIMENSIONAL OF | EXTRACTION TIME | ESTIMATED STATUS OF TIME te | THREE-DIMENSIONAL INFORMATION CALCULATION | | THREE-DIMENSIONAL INFORMATION RE-CALCULATION TARGET | RE-CALCULATION RANGE (X, Y, R) |
|---|---|---|---|---|---|---|---|---|
| | | | | | PRIORITY | EXECUTION STATUS | | |
| 0 | (10,10),(10,20),(20,10),(20,20) | X1,X2 | tx | (15,15),(15,25),(25,15),(25,25) | 100 | ACTIVE | Y | (100, 20, 5) |
| 1 | ⋮ | Y1,Y2,⋯ | tx+1 | ⋮ | 80 | WAIT | Y | (50, 20, 10) |
| 2 | ⋮ | ⋮ | ⋮ | ⋮ | −1 | N/A | N | ⋮ |
| ⋮ | ⋮ | ⋮ | ⋮ | ⋮ | ⋮ | ⋮ | ⋮ | ⋮ |

THREE-DIMENSIONAL INFORMATION CALCULATION DEVICE, THREE-DIMENSIONAL INFORMATION CALCULATION METHOD, AND AUTONOMOUS MOBILE DEVICE

TECHNICAL FIELD

The present invention relates to a three-dimensional information calculation device, a three-dimensional information calculation method, and an autonomous mobile device.

BACKGROUND ART

In recent years, research for capturing images of the front of a vehicle with a camera and detecting objects in front of one's vehicle is being actively conducted in the automobile industry. PTL 1 discloses a device for extracting a candidate region where an object may exist based on a two-dimensional optical flow calculated from time series images, and calculating three-dimensional information of only such candidate region.

CITATION LIST

Patent Literature

[PTL 1] Japanese Patent Application Publication No. 2010-286926

SUMMARY OF THE INVENTION

Problems to be Solved by the Invention

With the invention described in PTL 1, since three-dimensional information of all candidate regions where the object may exist needs to be calculated, much processing time is required.

Means to Solve the Problems

According to the first aspect of the present invention, a three-dimensional information calculation device comprises a first image input unit which continuously acquires a plurality of images from a first imaging unit, a second image input unit which continuously acquires a plurality of images from a second imaging unit, an object candidate region extraction unit which extracts an object candidate region where an object exists by using two or more images acquired by the first image input unit at different times, a region future estimation unit which estimates a future position of the object candidate region relative to an image capture range of the first imaging unit based on a position of the extracted object candidate region on a plurality of images, and a three-dimensional information calculation unit which calculates three-dimensional information of the object candidate region, in which three-dimensional information is deemed required based on the future position estimated by the region future estimation unit, based on corresponding points of the object candidate region in the images acquired by the first image input unit and the images acquired by the second image input unit.

According to the second aspect of the present invention, a three-dimensional information calculation method comprises the steps of continuously acquiring a plurality of images from a first imaging unit, continuously acquiring a plurality of images from a second imaging unit, extracting an object candidate region where an object exists by using two or more images acquired by the first image input unit at different times, estimating a future position of the object candidate region relative to an image capture range of the first imaging unit based on a position of the extracted object candidate region on a plurality of images, and calculating three-dimensional information of the object candidate region, in which three-dimensional information is deemed required based on the estimated future position, based on corresponding points of the object candidate region in an image included in the images acquired by the first image input unit and an image included in the images acquired by the second image input unit.

According to the third aspect of the present invention, an autonomous mobile device comprises the foregoing object detection device, a first imaging unit, a second imaging unit, a moving mechanism equipped with the three-dimensional information calculation device, the first imaging unit, and the second imaging unit, and a mechanism control unit which controls the moving mechanism based on outputs of the three-dimensional information calculation device.

Advantageous Effects of the Invention

The object detection device according to the present invention can speed up the processing because whether or not the calculation of three-dimensional information is required can be determined based on the position of the candidate region after a predetermined time.

BRIEF DESCRIPTION OF DRAWINGS

FIG. 5 is a diagram showing an example of a configuration of an object candidate region table.

FIG. 12 is a diagram showing an example of a configuration of the object candidate region table in the second embodiment.

DESCRIPTION OF EMBODIMENTS

The present invention aims to speed up the processing by limiting the processing target upon calculating three-dimensional information by using the images obtained via image capture. In other words, as the processing target region, only the candidate region included in the image capture range even after the lapse of a predetermined time, among the candidate regions where an object exists with a high probability, is deemed the processing target. The first to third embodiments of the present invention are now explained.
(First Embodiment)

Figure 1:
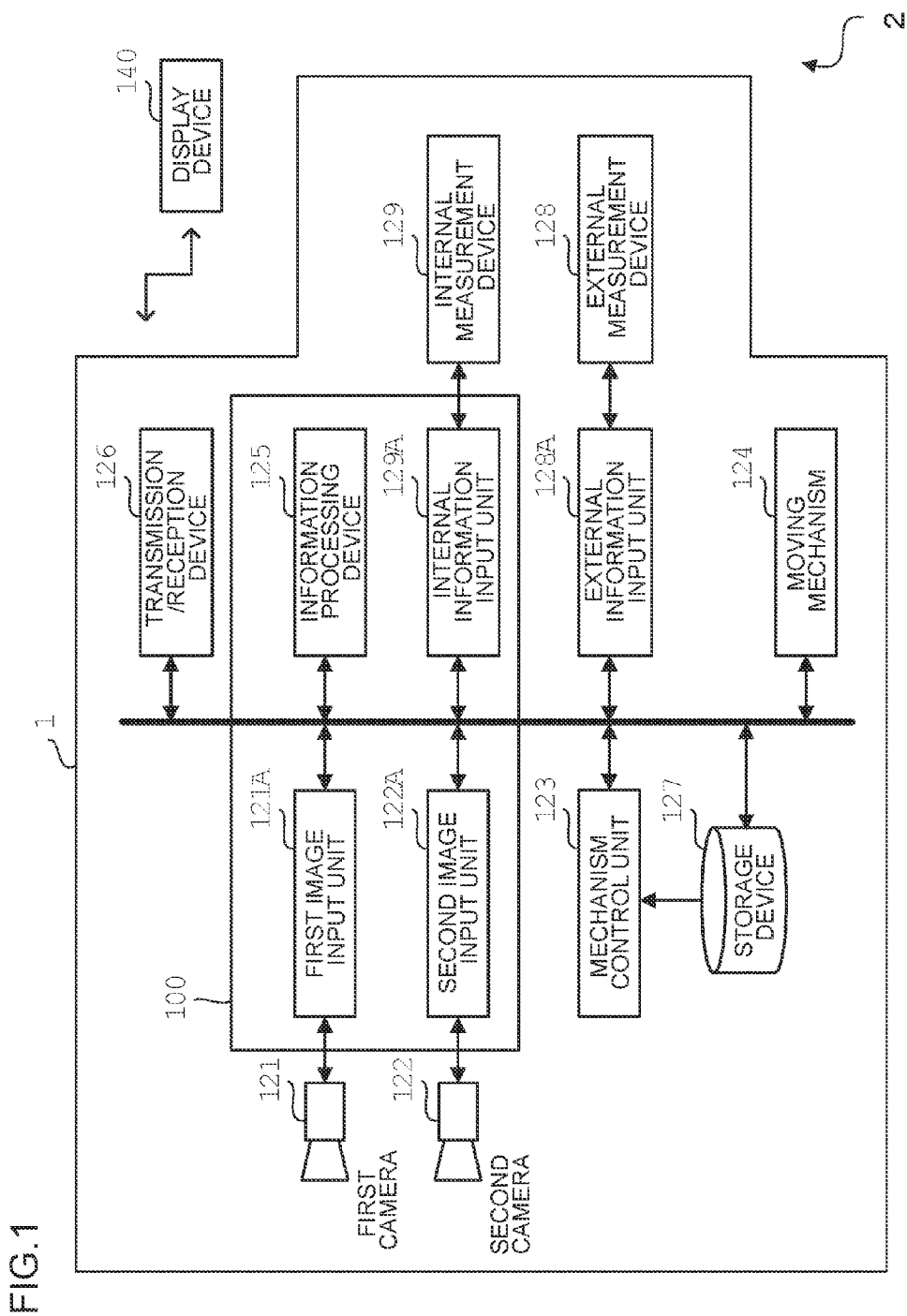
FIG. 1 is a block diagram showing a configuration of an autonomous mobile device.

The first embodiment of the object detection device and the autonomous mobile device according to the present invention is now explained with reference to FIG. 1 to FIG. 10. The autonomous mobile device travels toward its destination which is set in advance based on a latitude and a longitude. The autonomous mobile device detects stationary obstacles existing on the travel path and travels by avoiding the stationary obstacles. FIG. 1 is a block diagram showing a configuration of an autonomous mobile device. The autonomous mobile device 1 includes an object detection device 100, a first camera 121 and a second camera 122 which capture images around the autonomous mobile device 1, a moving mechanism 124 which causes the autonomous mobile device 1 to move, a mechanism control unit 123 which controls the moving mechanism 124, a storage device 127 which stores map information and the like, an external measurement device 128 which acquires information around the autonomous mobile device 1, an external information input unit 128A which imports the outputs of the external measurement device 128, and a transmission/reception device 126 communicates with a display device 140.

The object detection device 100 includes a first image input unit 121A which imports the images obtained by being captured by the first camera 121, a second image input unit 122A which imports the images obtained by being captured by the second camera 122, an internal information input unit 129A which imports the outputs of the internal measurement device 129, and an information processing device 125 which processes the images imported from the first image input unit 121A and the second image input unit 122A. The first image input unit 121A, the second image input unit 122A, the mechanism control unit 123, the storage device 127, the moving mechanism 124, the external information input unit 128A, the internal information input unit 129A, the information processing device 125, and the transmission/reception device 126 are connected via an internal bus, and mutually send and receive information.

The first camera 121 and the second camera 122 capture the images around the autonomous mobile device 1, and output the captured images to the first image input unit 121A and the second image input unit 122A, respectively. As described later, the images input from the first image input unit 121A are mainly used, and the images input from the second image input unit 122A are used upon calculating the three-dimensional position.

The moving mechanism 124 is a mechanism for causing the autonomous mobile device 1 to move, and is configured from, for instance, a motor and wheels. The moving mechanism 124 is controlled by the mechanism control unit 123.

The mechanism control unit 123 controls the moving mechanism 124 so that the autonomous mobile device 1 will travel toward the destination recorded in the storage device 127. When the object detection device 100 detects an object, the mechanism control unit 123 controls the moving mechanism 124 so that the autonomous mobile device 1 will avoid the object.

The information processing device 125 processes the images obtained by being captured by the first camera 121 and the second camera 122, and thereby detects objects in front of the autonomous mobile device 1. The configuration of the information processing device 125 will be described later.

The transmission/reception device 126 communicates with the display device 140 via wireless communication. The transmission/reception device 126 receives the user's instructions given from the display device 140 to the autonomous mobile device 1, and outputs the processing results of the information processing device 125 to the display device 140.

The storage device 127 is configured from a non-volatile memory. The storage device 127 stores travel control programs, destinations, maps and travel paths corresponding to the travel environment, and so on. In accordance with the foregoing travel control program, the autonomous mobile device 1 autonomously travels the actual environment by following the planned travel path while estimating its self-location on the map based on the measurement data measured by the external measurement device 128 and the internal measurement device 129 and the detection result of the information processing device 125.

The external measurement device 128 is an external sensor for measuring the data indicating the relative position and the absolute position outside (in the actual environment) of the autonomous mobile device 1. The external measurement device 128 includes, for instance, a GPS receiver which receives radio waves from a GPS satellite and calculates the absolute position of the autonomous mobile device 1. The external measurement device 128 outputs the measurement values to the external information input unit 128A.

The internal measurement device 129 includes, for example, a rotary encoder and a gyro sensor. The rotary encoder measures the amount of rotation of the wheels in the moving mechanism 124. The gyro sensor measures the posture of the autonomous mobile device 1; that is, the acceleration of the three rotational axes and the three transitional axes. The internal measurement device 129 outputs the measurement values to the internal information input unit 129A.

The display device 140 is, for example, a terminal having a display screen with a communication function or a GUI function.

Figure 2:
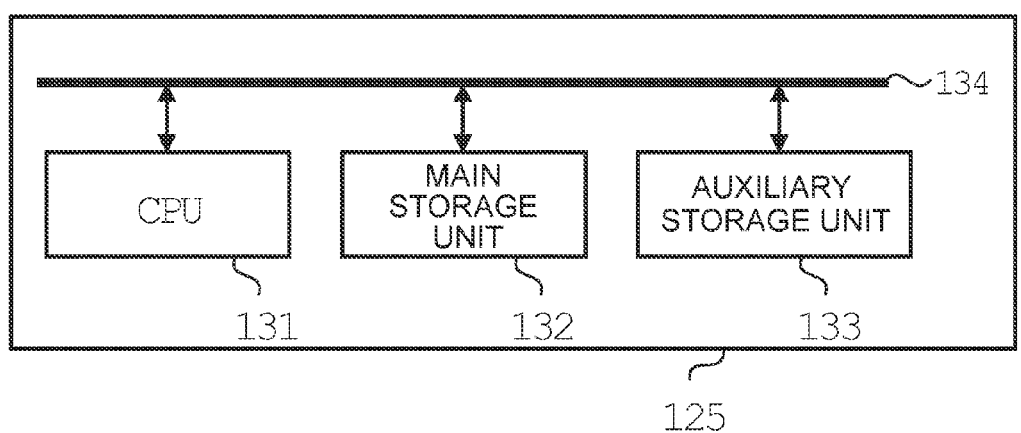
FIG. 2 is a block diagram showing a configuration of an information processing device.

FIG. 2 is a block diagram showing a configuration of the information processing device 125.

The information processing device 125 includes a CPU 131, a main storage unit 132, an auxiliary storage unit 133, and a bus 134. The CPU 131, the main storage unit 132, and the auxiliary storage unit 133 are connected via the bus 134, and mutually send and receive data.

By communicating with the display device 140, the transmission/reception device 126 receives the user's instructions given from the display device 140 to the autonomous mobile device 1, and outputs the processing results of the information processing device 125 to the display device 140.

The CPU 131 reads programs stored in the main storage unit 132 or the auxiliary storage unit 133. The CPU 131 performs arithmetic operations, and outputs the arithmetic results to the main storage unit 132, the auxiliary storage unit 133 or the mechanism control unit 123.

The main storage unit 132 is configured from a random access memory. The main storage unit 132 stores the programs to be executed by the CPU 131, the arithmetic results of the arithmetic operations performed by the CPU 131, and the setting information used by the information processing device 125 such as an object candidate region table 300, a scheduled calculation end time te, and a required calculation time tc described later. The main storage unit 132 stores a given number of images acquired by the first image input unit 121A or the second image input unit 122A as past images. The main storage unit 132 stores an object candidate region table which stores various types of information of the object candidate region, and local maps centered around the autonomous mobile device 1 which are generated by the map generation unit 202.

The auxiliary storage unit 133 stores the programs to be executed by the CPU 131, the arithmetic results of the arithmetic operations performed by the CPU 131, and the setting information used by the information processing device 125. The auxiliary storage unit 133 is particularly used for storing data which could not be stored in the main storage unit 132 due to lack of space, and for retaining data even in a state where the power is shut down. The auxiliary storage unit 133 is configured, for example, from a magnetic disk drive such as a hard disk drive or a non-volatile memory such as a flash memory, independently or in combination.

(Functional Block of Information Processing Device)

Figure 3:
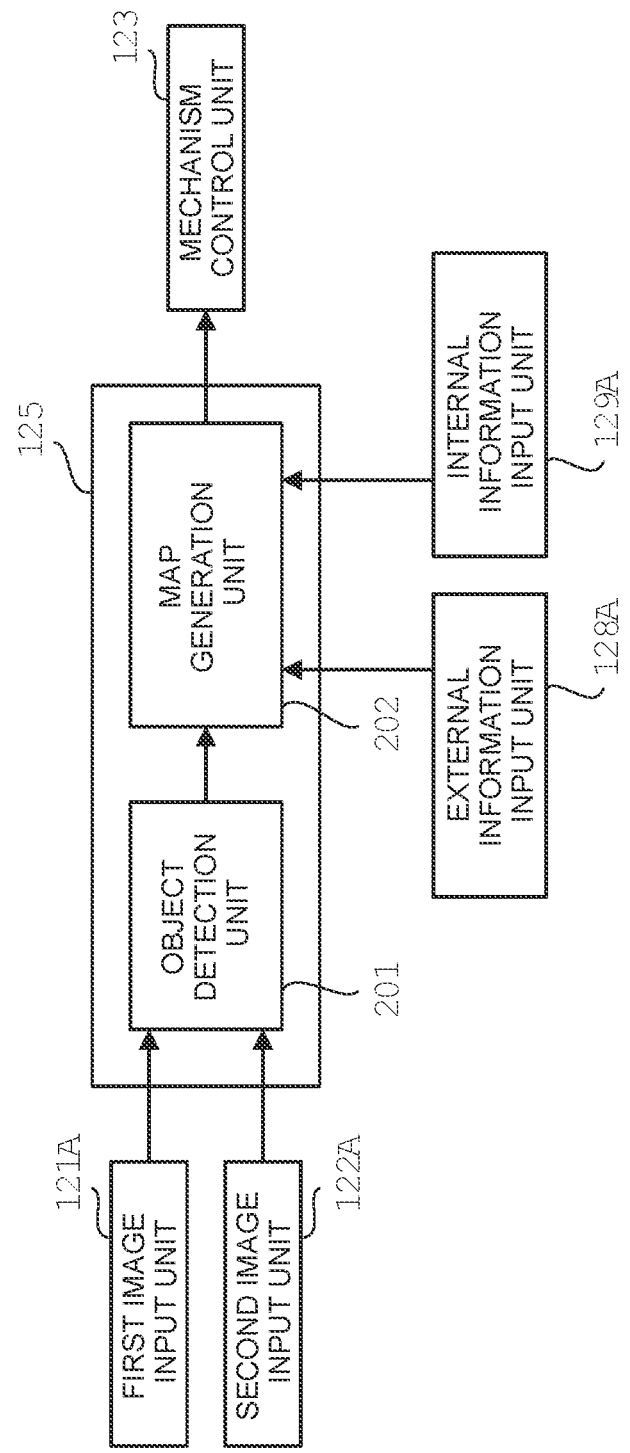
FIG. 3 is a block diagram showing a functional configuration of the information processing device.

FIG. 3 is a block diagram showing the functional configuration that is realized by the CPU 131 of the information processing device 125 executing the processing program stored in the main storage unit 132. The information processing device 125 includes an object detection unit 201, and a map generation unit 202. The object detection unit 201 outputs three-dimensional information by using the images that were input from the first image input unit 121A, and the second image input unit 122A. This will be described in detail later.

The map generation unit 202 acquires the measurement values of the external measurement device 128 from the external information input unit 128A, and acquires the measurement values of the internal measurement device 129 from the internal information input unit 129A. The map generation unit 202 calculates the location and posture of the autonomous mobile device 1 based on the foregoing measurement values, and generates a map of obstacles centered around the autonomous mobile device 1 based on the three-dimensional information acquired from the object detection unit 201. For example, as the format of the map, a Digital Elevation Map (this is hereinafter referred to as "DEM") is used. DEM is a map in which a top view of the real world space is divided into grids of a certain size, and the values of the heights representing the respective grids are recorded. Since the height that can be cleared by the moving mechanism 124 of the autonomous mobile device 1 is known, the mechanism control unit 123 can determine that a grid recorded with a height of a predetermined value or higher cannot be travelled by the autonomous mobile device 1. The mechanism control unit 123 plans the local travel position path based on the generated map and the path plan that is set in advance, and enables the autonomous mobile device 1 to autonomously travel by controlling the moving mechanism 124 so that the autonomous mobile device 1 will travel along the planned path.

(Details of Object Detection Unit)

Figure 4:
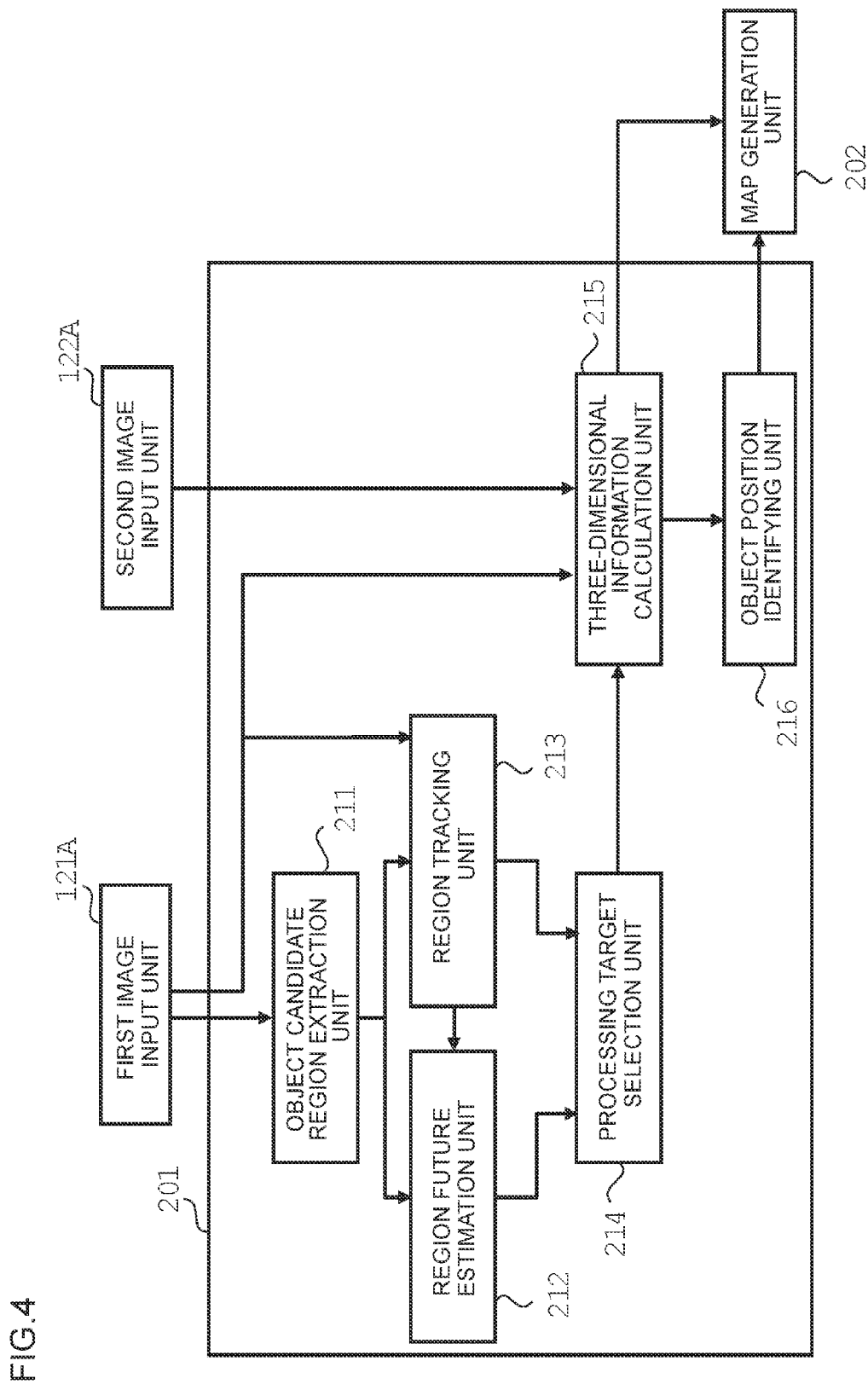
FIG. 4 is a block diagram showing a functional configuration of an object detection unit.

FIG. 4 is a block diagram showing a functional configuration of the object detection unit 201. The object detection unit 201 includes an object candidate region extraction unit 211, a region future estimation unit 212, a region tracking unit 213, a processing target selection unit 214, a three-dimensional information calculation unit 215, and an object position identifying unit 216.

The object candidate region extraction unit 211 uses two or more time series images acquired by the first camera 121 to calculate a region on the image where an object likely exists (this is hereinafter referred to as the "object candidate region") and its two-dimensional optical flow. The object candidate region extraction unit 211 stores the vertex coordinates of the region and the time that the object candidate region was extracted in the object candidate region table 300 described later with reference to FIG. 5. However, the time that the object candidate region was extracted shall be the image capture time of the latest image used for extracting the region. Moreover, the optical flow is not calculated for any region in which the object candidate region has previously been set in the object candidate region table 300.

As a method of calculating the object candidate region, for example, known is a method of calculating the two-dimensional optical flow in pixel units based on corresponding point search processing between two images captured at different image capture times, calculating the possibility of the existence of an object based on the calculated two-dimensional optical flow, and extracting an object candidate region based on the calculated possibility. With this method, in addition to being able to extract the object candidate region, the two-dimensional optical flow can be acquired for the entire object candidate region.

The region future estimation unit 212 acquires, from the object candidate region table 300, the object candidate region and its two-dimensional optical flow calculated by the object candidate region extraction unit 211. The region future estimation unit 212 performs the following processing to each of the acquired object candidate regions. Specifically, the region future estimation unit 212 estimates coordinates on the image at a certain point in time in the future based on the two-dimensional optical flow of a certain object candidate region, and stores the estimated coordinates in the object candidate region table 300. When the three-dimensional information calculation unit 215 is performing its calculation, the region future estimation unit 212 estimates the coordinates at the scheduled calculation end time te thereof. When the three-dimensional information calculation unit 215 is not performing its calculation, the region future estimation unit 212 calculates the area of each object candidate region and selects the object candidate region with the largest area, and calculates the time required for calculating the three-dimensional information thereof; that is, the required calculation time tc. The region future estimation unit 212 subsequently estimates the coordinates after the lapse of the required calculation time tc from the current time. The time tc required for the three-dimensional information calculation unit 215 to calculate the three-dimensional information is calculated according to a predetermined formula which is proportional to the area on the image for which the three-dimensional information is to be calculated.

As a method for the region future estimation unit 212 to estimate the future coordinates on the image, publicly known methods may be used. For example, known is a method where the probability that a past status will reappear in the future (temporal recurrence probability) is calculated, and time is sampled based on the calculated temporal recurrence probability. The estimated value of the past status at the sampled time is then referenced, and the kernel distribution thereof is convolved to predict the distribution of the status.

When the first camera 121 acquires an image (this is hereinafter referred to as the "latest acquired image"), the region tracking unit 213 acquires an object candidate region from the object candidate region table 300. This object candidate region is a region that was calculated by using images that were previously acquired by the first camera 121. The region tracking unit 213 performs the following processing to each of the acquired object candidate regions. Specifically, the region tracking unit 213 calculates the object candidate region corresponding to the latest acquired image based on the corresponding point search processing between the latest acquired image and the image that was acquired immediately before the latest acquired image. When there is no corresponding object candidate region, the region tracking unit 213 deletes the entries including that object candidate region from the object candidate region table 300. When there is a corresponding object candidate region, the region tracking unit 213 calculates the two-dimensional optical flow based on the corresponding point search processing, and adds the result to the object candidate region table 300 as the two-dimensional optical flow of that object candidate region.

The processing target selection unit 214 acquires an object candidate region from the object candidate region table 300, and performs the following processing to each of the acquired object candidate regions. Specifically, the processing target selection unit 214 determines whether or not to calculate the three-dimensional information based on the future coordinates of the object candidate region on the image calculated by the region future estimation unit 212. In other words, the processing target selection unit 214 determines that the three-dimensional information should not be calculated when the future coordinates of the object candidate region on the image exceeds the range of the coordinates on the image output by the first camera 121 on grounds that the object candidate region will exist outside the image capture range of the future camera 121 at such point in time in the future.

The processing target selection unit 214 assigns, as the three-dimensional information calculation priority of the object candidate region table 30, a positive value to an object candidate region which was determined that three-dimensional information should be calculated, and a negative value to an object candidate region which was determined that three-dimensional information should not be calculated. When there a plurality of regions which were determined that three-dimensional information should be calculated, the processing target selection unit 214 records the priority in descending order from the object candidate region having the largest area; that is, from the largest positive value.

The three-dimensional information calculation unit 215 calculates the three-dimensional information corresponding to the respective pixels in the object candidate region based on the corresponding point search processing between a first image acquired by the first camera 121 and a second image acquired by the second camera 122. Once the three-dimensional information calculation unit 215 starts the processing, the three-dimensional information calculation unit 215 records a value which represents the execution status; for instance, "ACTIVE", as the three-dimensional information calculation execution status in the corresponding entry of the object candidate region table 300. Once the three-dimensional information calculation unit 215 completes the processing, the three-dimensional information calculation unit 215 records a value which represents the completion of execution; for instance, "DONE", as the three-dimensional information calculation execution status in the corresponding entry of the object candidate region table 300.

The object position identifying unit 216 acquires the three-dimensional information of the object candidate region from the three-dimensional information calculation unit 215, and detects objects based on the three-dimensional information; for instance, the distance from the autonomous mobile device 1 to the respective points of the object candidate region. The object position identifying unit 216 stores in the main storage unit 132, as ultimate information of the object, the value obtained by subtracting the mobile vector of the autonomous mobile device 1 from the information of the detected object, and transmits the information to the map generation unit 202. The foregoing mobile vector is the mobile vector of the autonomous mobile device 1 that will travel during the period from the time that the images used for extracting the object candidate region were acquired to the time that the calculation of the three-dimensional information was completed. For example, when the object is detected as a voxel in a three-dimensional space, the coordinates obtained by subtracting the mobile vector from the coordinates of the center of gravity of the voxel will become ultimate center of gravity coordinates of the object. In other words, since the coordinate system with the autonomous mobile device 1 as the origin will move, the center of gravity coordinates of the object are calculated by giving consideration to the distance of such movement. Existing methods may be used for the object detection processing.

(Object Candidate Region Table)

FIG. 5 is a diagram showing an example of a configuration of the object candidate region table 300.

The object candidate region table 300 shown in FIG. 5 is configured from a plurality of entries. For example, the plurality of entries include region vertex coordinates, two-dimensional optical flow history, time that the region was extracted, estimated status of the region at time te, three-dimensional information calculation priority, and three-dimensional information calculation execution status.

The region vertex coordinates are the coordinates of the vertexes configuring the object candidate region in the image acquired by the first image input unit 121A. FIG. 5 shows the coordinates of four vertexes in a case where the region is expressed as a rectangle. The region vertex coordinates are recorded by the object candidate region extraction unit 211.

The two-dimensional optical flow history shows a predetermined number of two-dimensional optical flows, in chronological order, which were calculated based on the corresponding point search processing of the images obtained by being captured by the first camera 121 at different image capture times. For example, in the example of FIG. 5, when focusing on the object candidate region having an ID of 0, two two-dimensional optical flows of X1 and X2 are shown. As described above, the two-dimensional optical flow is recorded by the object candidate region extraction unit 211, and the region tracking unit 213.

The extraction time records the image capture time of the latest acquired image that was used for extracting the object candidate region or tracking the region. The extraction time is recorded by the object candidate region extraction unit 211, and the region tracking unit 213.

The estimated status of the region at time te is expressed based on the estimated coordinates of the object candidate region on the image at the scheduled calculation end time te. This value is recorded by the region future estimation unit 212.

The three-dimensional information calculation priority is expressed based on a value indicating the priority of calculating the three-dimensional information of the object candidate regions. As the three-dimensional information calculation priority, a positive value is recorded for an object candidate region in which the three-dimensional information should be calculated, and a negative value is recorded for an object candidate region in which the three-dimensional information should not be calculated. A large value is recorded when the priority is high. The value of the three-dimensional information calculation priority is recorded by the processing target selection unit 214. The three-dimensional information calculation execution status is expressed based on a value indicating whether or not the three-dimensional information of the object candidate region is currently being calculated. This value is recorded by the three-dimensional information calculation unit 215.

(Flowchart)

The flow of processing of the object detection device 100; that is, the flow of processing for the autonomous mobile device 1 to calculate the three-dimensional information, is now explained with reference to FIG. 6 and FIG. 7.

Figure 6:
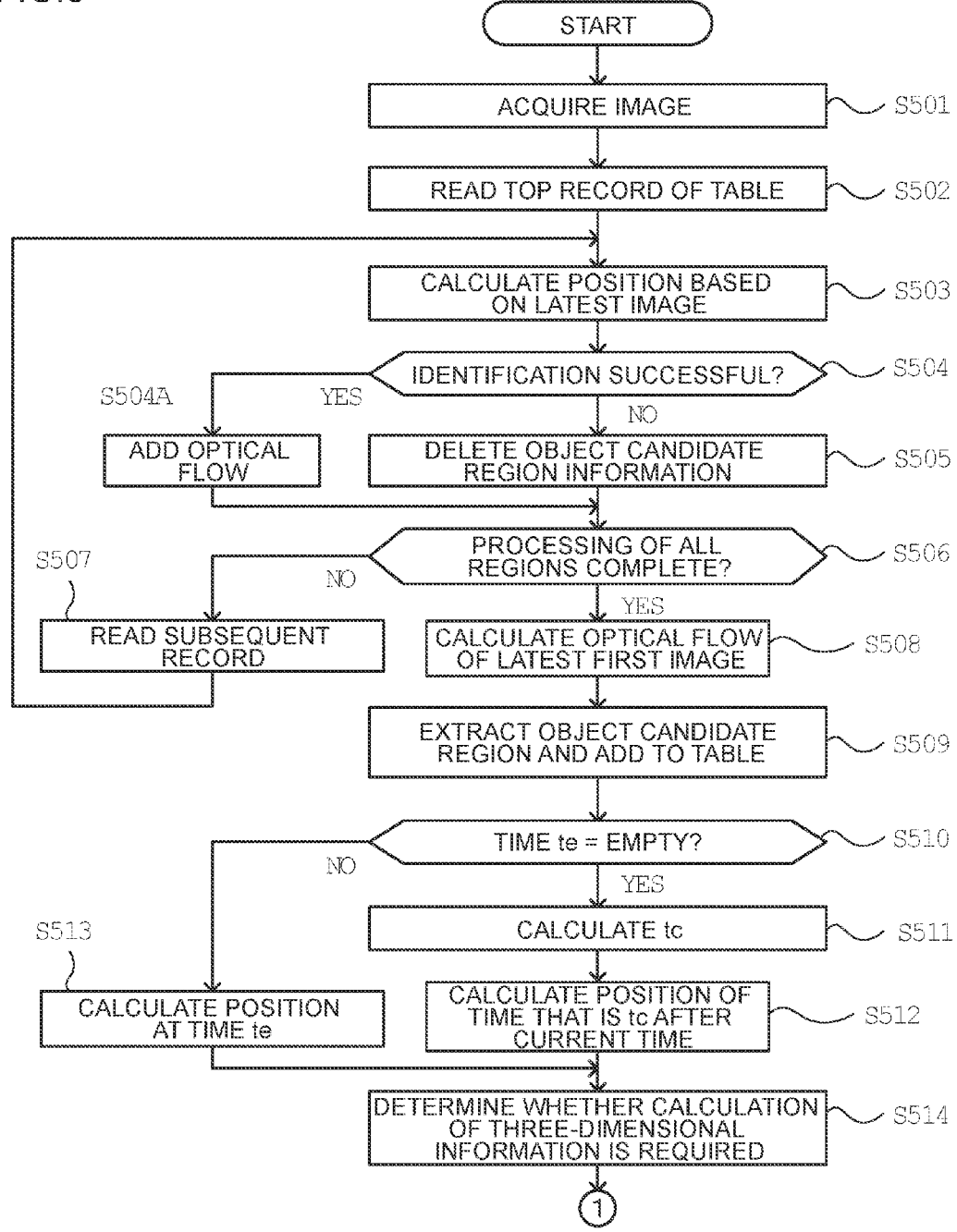
FIG. 6 is a flowchart showing the processing of calculating three-dimensional information.
Figure 7:
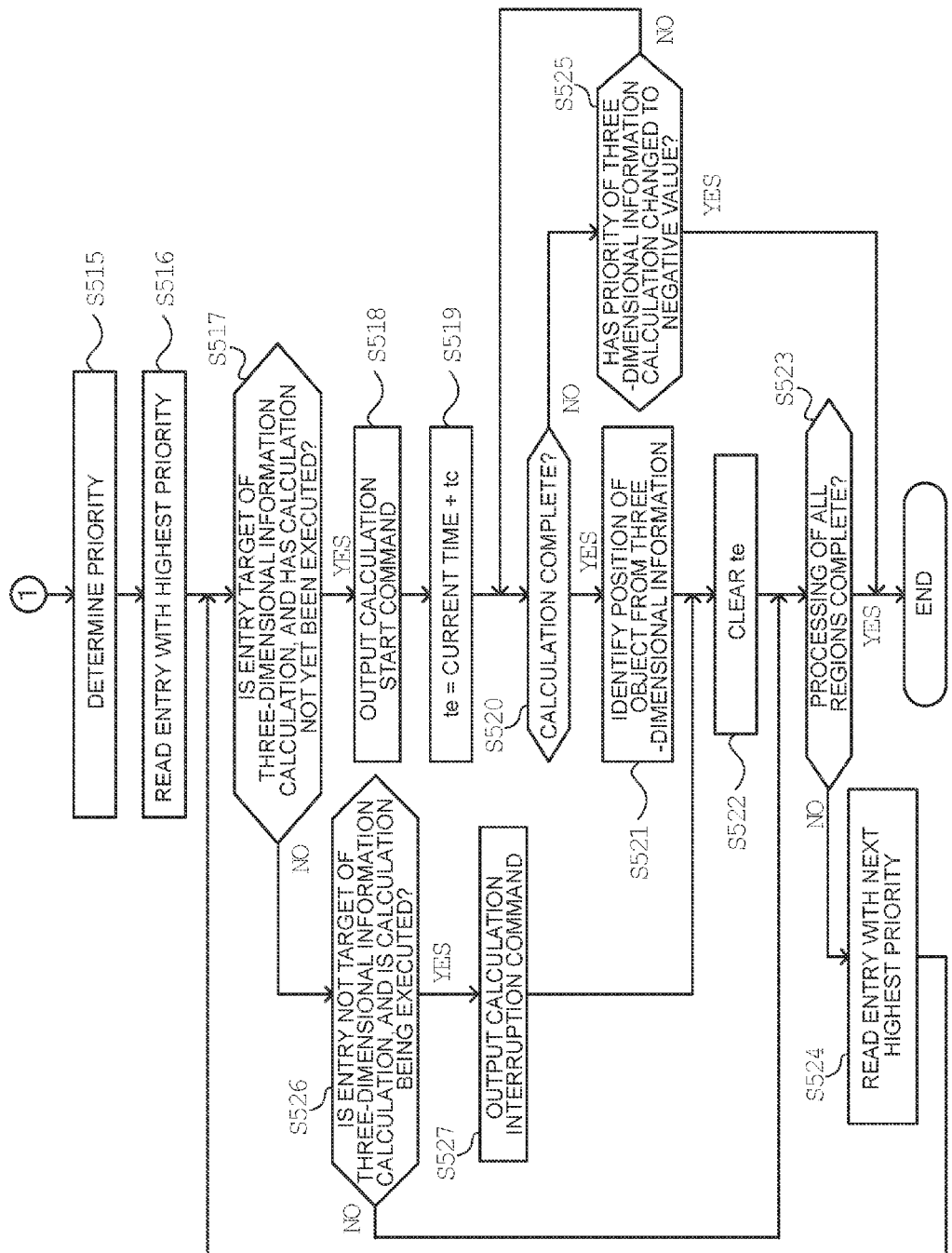
FIG. 7 is the second half of the flowchart shown in FIG. 6.

FIG. 6 and FIG. 7 are flowcharts showing the operation of the program to be executed by the information processing device 125 of the object detection device 100. In the ensuing explanation, the execution agent of the flowchart is the CPU 131 of the information processing device 125.

The first camera 121 and the second camera 122 capture and acquire images around the autonomous mobile device 1 at predetermined time intervals. When the first camera 121 and the second camera 122 capture images, the information processing device 125 executes the following program.

In step S501, the information processing device 125 uses the first image input unit 121A and the second image input unit 122A to acquire the latest captured images from the first camera 121 and the second camera 122, and then proceeds to step S502. In the ensuing explanation, the latest image acquired by the first image input unit 121A is referred to as the latest first image, and the latest image acquired by the second image input unit 122A is referred to as the latest second image.

In step S502, the information processing device 125 reads the top entry of the object candidate region table 300; that is, the entry in which the ID is 0, and then proceeds to step S503.

In step S503, the information processing device 125 uses the region tracking unit 213 to calculate the two-dimensional optical flow of the object candidate region of the read entry, calculates the position of the object candidate region in the latest first image, and then proceeds to step S504.

In step S504, the information processing device 125 determines whether or not it was possible to calculate the position of the object candidate region in the latest first image in step S503. The information processing device 125 proceeds to step S504A upon determining that it was possible to calculate the foregoing position, and proceeds to step S505 upon determining that it was not possible to calculate the foregoing position. In step S504A, the information processing device 125 adds the two-dimensional optical flow calculated in step S503 as the data of the two-dimensional OF the corresponding entry in the object candidate region table 300, and then proceeds to step S506.

In step S505, the information processing device 125 deletes the corresponding entry in the object candidate region table 300, and then proceeds to step S506. This is because it was not possible to track the object candidate region of the corresponding entry in the latest first image.

In step S506, the information processing device 125 determines whether or not the entry that is currently being read is the last entry of the object candidate region table 300. When the information processing device 125 determines that the entry is the last entry; that is, when the information processing device 125 determines that the processing of step S503 to S505 has been performed for all entries, the information processing device 125 proceeds to step S508. When the information processing device 125 determines that the entry is not the last entry, the information processing device 125 proceeds to step S507.

In step S507, the information processing device 125 reads the subsequent entry of the object candidate region table 300, and then returns to step S503.

In step S508 which is executed when the information processing device 125 determines that all entries have been read, the information processing device 125 uses the object candidate region extraction unit 211 to calculate the two-dimensional optical flow other than the object candidate region, and then proceeds to step S509.

In step S509, the information processing device 125 extracts a new object candidate region based on the two-dimensional optical flow calculated in step S508. The information processing device 125 records the extracted object candidate region in the object candidate region table 300, and then proceeds to step S510.

In step S510, the information processing device 125 determines whether or not some kind of time has been recorded as the scheduled calculation end time te stored in the main storage unit 132. The information processing device 125 proceeds to step S511 upon determining no time has been recorded, and proceeds to step S513 upon determining that some kind of time has been recorded. This step is performed to determine whether or not the three-dimensional information calculation unit 215 is calculating three-dimensional information.

In step S511, the information processing device 125 uses the region future estimation unit 212 to calculate the required calculation time tc. In other words, the information processing device 125 calculates the area of each object candidate region indicated in the object candidate region table 300 and selects the object candidate region with the largest area, calculates the required calculation time tc by plugging that area into a predetermined formula, and then proceeds to step S512.

In step S512, the information processing device 125 uses the region future estimation unit 212 to calculate, for each object candidate region indicated in the object candidate region table 300, the coordinates of each object candidate region on the image at the time that the required calculation time tc has elapsed, and then proceeds to step S514.

In step S513 which is executed when the information processing device 125 determines that some kind of time has been recorded as the scheduled calculation end time te, the information processing device 125 uses the region future estimation unit 212 to calculate the coordinates of each object candidate region on the image at the scheduled calculation end time te, and then proceeds to step S514.

In step S514 of FIG. 6, the information processing device 125 uses the processing target selection unit 214 to determine whether or not the three-dimensional information of each object candidate region should be calculated. In other words, the information processing device 125 determines that the three-dimensional information should be calculated when the coordinates calculated in step S512 or step S513 are within the range of coordinates of the image output by the first camera 121, and then proceeds to step S515.

In step S515, the information processing device 125 uses the processing target selection unit 214 to determine the three-dimensional information calculation priority, and stores the three-dimensional information calculation priority in the object candidate region table 300. In other words, the information processing device 125 calculates the area of the object candidate region which was determined that three-dimensional information should be calculated in step S514, and assigns a larger positive value as the area is larger. The information processing device 125 records "−1" for an object candidate region which was determined that three-dimensional information should not be calculated, and then proceeds to step S516.

In step S516, the information processing device 125 reads the entry with the highest three-dimensional information calculation priority from the object candidate region table 300, and then proceeds to step S517.

In step S517, the information processing device 125 determines whether or not the read entry satisfies both of the following two conditions; that is, (1) the entry is subject to the calculation of three-dimensional information, and (2) the calculation has not yet been started. In the example of FIG. 5, whether both of the following two conditions; specifically, (1) the priority is a positive value, and (2) the execution status is "WAIT", are satisfied, is determined. The information processing device 125 proceeds to step S518 upon determining that the two conditions are satisfied, and proceeds to step S526 upon determining that at least one of the conditions is not satisfied.

In step S518, the information processing device 125 sends a calculation start command to the three-dimensional information calculation unit 215, and starts the calculation of the three-dimensional information of the object candidate region indicated in the read entry. Once the three-dimensional information calculation unit 215 starts the calculation, the three-dimensional information calculation unit 215 changes the execution status of the object candidate region table 300. In the example of FIG. 5, the execution status is changed to "ACTIVE". The information processing device 125 then proceeds to step S519.

In step S519, the information processing device 125 stores, as the scheduled calculation end time te stored in the main storage unit 132, the time obtained by adding the required calculation time tc to the current time, and then proceeds to step S520.

In step S520, the information processing device 125 determines whether or not the calculation of the three-dimensional information by the three-dimensional information calculation unit 215 is complete, proceeds to step S521 upon determining that the calculation is complete, and proceeds to step S525 upon determining that the calculation is ongoing.

In step S521, the information processing device 125 uses the object position identifying unit 216 to identify the position of the object, outputs the information thereof to the map generation unit 202, and then proceeds to step S522.

In step S522, the information processing device 125 clears the scheduled calculation end time te stored in the main storage unit 132. In other words, the information processing device 125 changes the scheduled calculation end time te to a status where no time is being stored, and then proceeds to step S523.

In step S523, the information processing device 125 determines whether or not processing has been performed for all regions stored in the object candidate region table 300. The information processing device 125 ends the program in which the operation is indicated in FIG. 6 and FIG. 7 upon determining that processing has been performed for all regions, and proceeds to step S524 upon determining that processing has not been performed for all regions.

In step S524, the information processing device 125 reads the entry with the next highest priority after the entry that is currently being read, and then returns to step S517.

In step S525 which is executed when the information processing device 125 determines that the calculation of the three-dimensional information by the three-dimensional information calculation unit 215 is not yet complete, the information processing device 125 determines whether or not the three-dimensional information calculation priority of the entry that is currently being read has been changed to a negative value. The information processing device 125 ends the program in which the operation is indicated in FIG. 6 and FIG. 7 upon determining that the three-dimensional information calculation priority has been changed to a negative value, and returns to step S520 upon determining the three-dimensional information calculation priority has not been changed to a negative value.

In step S526 which is executed when a negative result is obtained in the determination of step S517, the information processing device 125 determines whether or not the read entry satisfies both of the following two conditions; that is, (1) the entry is not subject to the calculation of three-dimensional information, and (2) the calculation has previously been started. In the example of FIG. 5, whether or not both of the following two conditions; specifically, (1) the priority is a negative value, and (2) the execution status is "ACTIVE", are satisfied, is determined. The information processing device 125 proceeds to step S527 upon determining that the two conditions are satisfied, and proceeds to step S523 upon determining that at least one of the conditions is not satisfied.

In step S527, the information processing device 125 outputs a calculation interruption command to the three-dimensional information calculation unit 215, and the proceeds to step S522.

(Operational Example)

Figure 8:
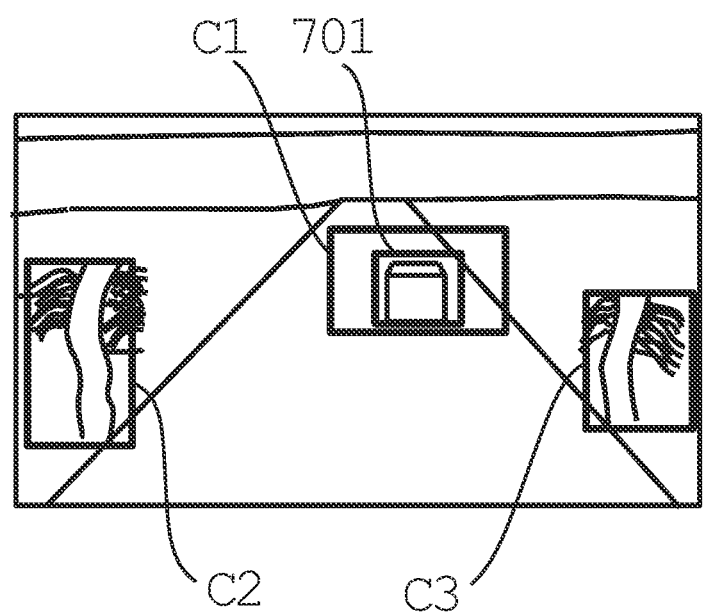
FIG. 8 is a captured image diagram showing an operational example of an object detection device.

An operational example of the object detection device 100 is now explained with reference to FIG. 8 to FIG. 10.

The immediate environment and an image obtained as a captured image are foremost explained. The autonomous mobile device 1 equipped with the object detection device 100 which captures images of the front of the autonomous mobile device 1 is traveling in a straight line on a road, a tree is planted on each side of the road, and there is one preceding vehicle. The image obtained as a captured image in the foregoing case is shown in FIG. 8, and the three boxed regions are the regions that are recognized as the object candidate regions. In the ensuing explanation, the object candidate region containing the preceding vehicle is referred to as the region C1, and the object candidate regions containing the tree are referred to as the region C2 and the region C3, respectively. Note that, while the region C1 is detected to be larger than the preceding vehicle, the accurate position is calculated as represented with reference numeral 701 as a result of the object position identifying unit 216 being activated after the three-dimensional information is calculated.

While the trees are stationary relative to the road, since the autonomous mobile device 1 is traveling on the road, the region C2 and the region C3 will appear to be moving from the images that are captured continuously in a time series. Since the autonomous mobile device 1 is traveling in a straight line on the road, after the autonomous mobile device 1 travels for a while, the region C2 and the region C3 will move outside the image capture range. While the autonomous mobile device 1 is traveling at a constant speed, the preceding vehicle accelerated immediately before time ta+2 described later, and decelerated immediately after time ta+2. When the preceding vehicle accelerates, the region C1 will move to the upper part of the image.

The operation of the object detection device 100 in the foregoing situation is now explained with reference to FIG. 9 and FIG. 10.

Figure 9:
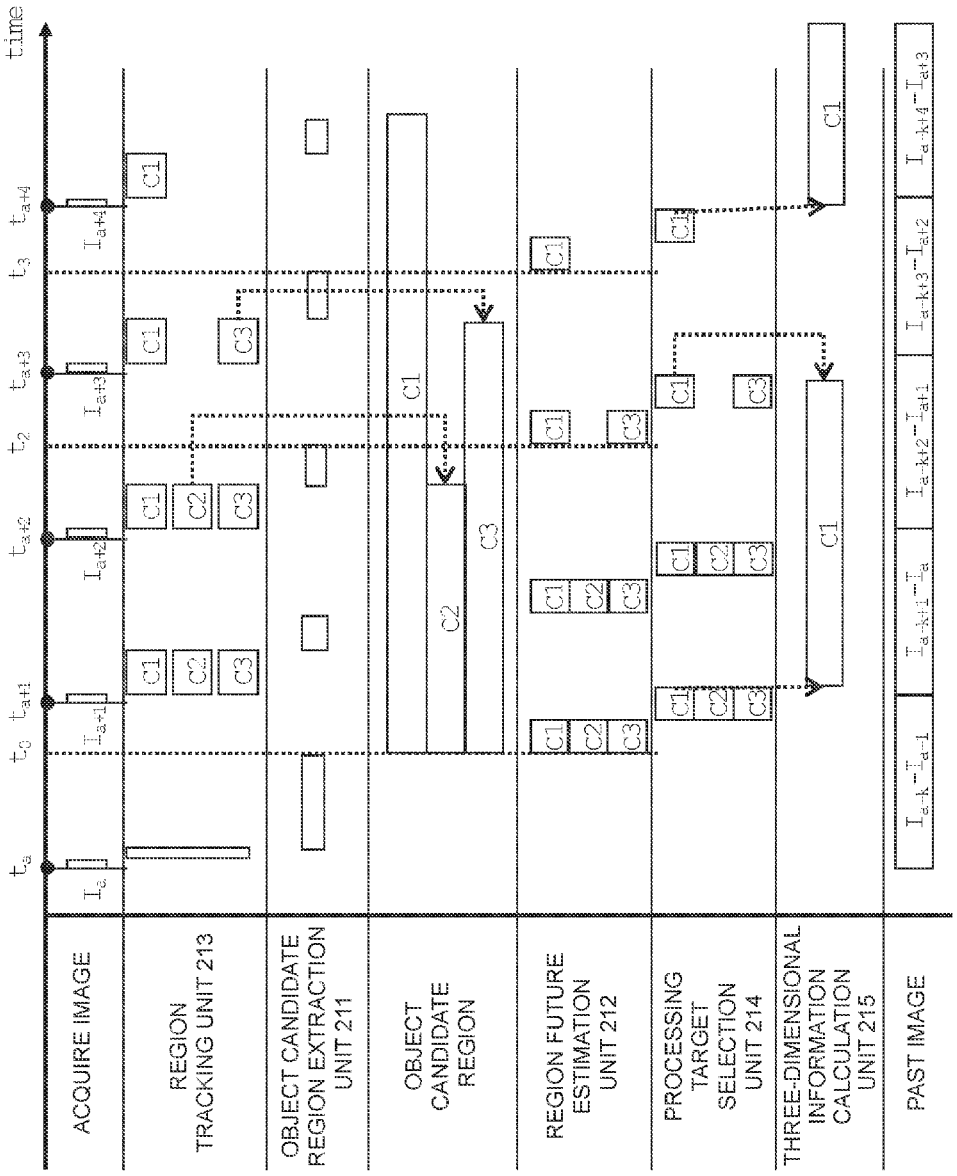
FIG. 9 is a timing chart showing an operational example of the object detection device.

FIG. 9 is a timing chart showing the operation of the object detection unit 201 and the entries stored in the object candidate region table 300. In FIG. 9, time is passing from left to right. At the beginning when the processing shown in FIG. 9 is started, that is, before time ta, there is no entry in the object candidate region table 300.

FIG. 10 is a diagram showing the position of the region extracted by the object candidate region extraction unit 211 and the position of the region estimated by the region future estimation unit 212 in the image acquired by the first image input unit 121A. In FIG. 10, time is passing from left to right as with FIG. 9. The time is synchronized in FIG. 9 and FIG. 10.

Explanation is foremost provided with reference to FIG. 9.

The first image input unit 121A and the second image input unit 122A acquire images each time the first camera 121 and the second camera 122 capture images; that is, at predetermined time intervals. In FIG. 9, images are respectively acquired at time ta, ta+1, ta+2, ta+3, and ta+4. In other words, step S501 of FIG. 6 is executed at time ta, ta+1, . . . , and steps are sequentially executed once the foregoing processing is complete. In the ensuing explanation, the first image acquired at time ta is referred to as Ia, and the latest first image acquired at time ta+1 is referred to as Ia+1, . . . . The main storage unit 132 stores k−1 number of past time series images (Ia−1 to Ia-k) which were previously captured.

In the ensuing explanation, while the series of processing from time ta, ta+1, ta+2, ta+3 will be explained, the explanation will be omitted in cases where the processing contents are the same and the results are also the same.

(Series of Processing from Time ta)

When the import of the image at time ta (step S501) is complete, whether or not there is an entry in the object candidate region table 300 is determined (step S501A), and the processing of the region tracking unit 213 is not performed since there is no entry at this point in time. Subsequently, the object candidate region extraction unit 211 calculates the optical flow (step S508) and extracts the object candidate region (step S509), and the regions C1, C2, C3 are recorded in the object candidate region table 300. The time that this processing is completed is t0.

Figure 10A:
FIGS. 10A-10D are diagrams showing a time series change of an object candidate region in an operational example.

FIG. 10(a) is a diagram showing the image Ia acquired at time ta and the object candidate regions C1 to C3 extracted by the object candidate region extraction unit 211. FIG. 10(a) shows a state where the object candidate region extraction unit 211 extracted the object candidate regions relative to the first image (Ia) acquired at time ta and the object candidate regions (C1 to C3) have been obtained at time t0 when the processing was completed.

Explanation is continued by returning to FIG. 9.

Since the scheduled calculation end time te has not been recorded at time t0 which is the time that the extraction of the object candidate region by the region future estimation unit 212 (step S509) was completed (step S510: YES), time tc1, which is determined according to the area of the largest object candidate region, is calculated. Subsequently, the region future estimation unit 212 acquires the entries of the object candidate regions (C1 to C3) from the object candidate region table 300, and estimates the status after the lapse of time tc1 from the current time based on the two-dimensional optical flow included in the obtained entries (step S513). Here, the region future estimation unit 212 estimates that, after the lapse of time tc1, only the region C1 will remain within the image capture range of the first camera 121, and the regions C2 and C3 will move outside the image capture range.

Subsequently, the processing target selection unit 214 acquires the estimated future status of the regions stored in the object candidate region table 300, determines whether or not three-dimensional information should be calculated based on the acquired estimated status, and stores the determined result in the object candidate region table 300. Here, the processing target selection unit 214 determines that the three-dimensional information should be calculated only for the region C1 which will remain within the image capture range of the first camera 121 even after the lapse of time tc1 from the current time (steps S514, S515). The time that this processing is completed is tt.

Figure 10B:
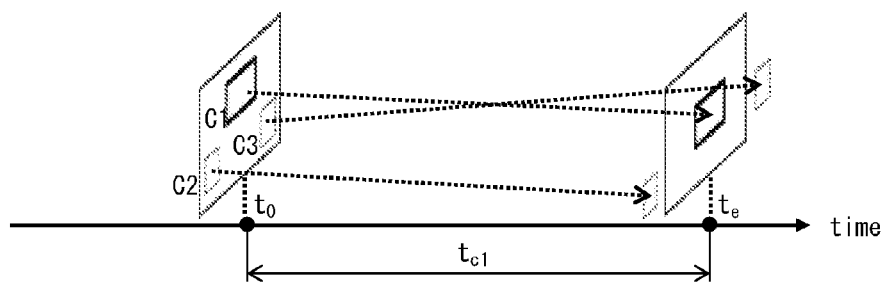

FIG. 10(b) is a diagram showing the status of the object candidate regions (C1 to C3) after the lapse of time tc1 estimated by the region future estimation unit 212 at time t0. FIG. 10(b) shows a status where, while the object candidate region C1 has been estimated to be within the image capture range of the first camera 121 after the lapse of time tc1, the object candidate regions C2 and C3 were estimated as being outside the image capture range.

Explanation is continued by returning to FIG. 9.

Since the region C1 is subject to the calculation of three-dimensional information but the calculation has not yet been started (step S517: YES), the information processing device 125 instructs the three-dimensional information calculation unit 215 to start the calculation of three-dimensional information (step S518). The three-dimensional information calculation unit 215 records in the entry of the region C1 of the object candidate region table 300 that the three-dimensional information is currently being calculated. The information processing device 125 records, as the scheduled calculation end time te, the time obtained by adding the required calculation time tc1 to the current time tt (step S519). Subsequently, the information processing device 125 continues waiting for the calculation by the three-dimensional information calculation unit 215 to be completed, or the object candidate region table 300 to be changed (step S520: NO, step S525: NO).

(Series of Processing from Time ta+1)

At time ta+1, which is slightly before time tt described above, the first image input unit 121A imports the image Ia+1 (step S501). Since there is an entry in the object candidate region table 300 (step S501A: YES), the region tracking unit 213 performs processing for tracking the regions C1 to C3 (steps S503 to 506). Since it was possible to track all regions C1 to C3 in the image Ia+1, the entries of the object candidate region table 300 are not deleted.

Since the scheduled calculation end time te has been recorded (step S510: YES), the region future estimation unit 212 estimates the status of the respective regions at the scheduled calculation end time te (step S513). The processing target selection unit 214 determines that the three-dimensional information should be calculated only for the region C1 as with the case described above (steps S514, S515).

Since the calculation has been started regarding the entry of the region C1 (step S517: NO) and the entry is subject to the calculation of three-dimensional information (step S526: NO), the information processing device 125 does not perform any particular processing. Since the entries of the regions C2 and C3 are not subject to the calculation of three-dimensional information (step S517: NO), and the calculation of three-dimensional information has not yet been started (step S526: NO), the information processing device 125 ends the program without performing any particular processing.

(Series of Processing from Time ta+2)

At time ta+2 after a predetermined time has elapsed from time ta+1, the first image input unit 121A imports the image Ia+2 (step S501). The region tracking unit 213 performs processing for tracking the regions C1 to C3 (step S503 to 506), but since the region C2 could not be tracked, the entry of the region C2 is deleted from the object candidate region table 300.

The region future estimation unit 212 starts the calculation at time t2, and estimates the status of the regions C1 and C3, which have entries in the object candidate region table 300, at time te. Since the preceding vehicle accelerated immediately before time ta+2, the region C1 in the image Ia+2 will move to the upper part of the image Ia+2. Consequently, the region future estimation unit 212 estimates that both the regions C1 and C3 will move outside the image capture range of the first camera 121 at time te.

Figure 10C:
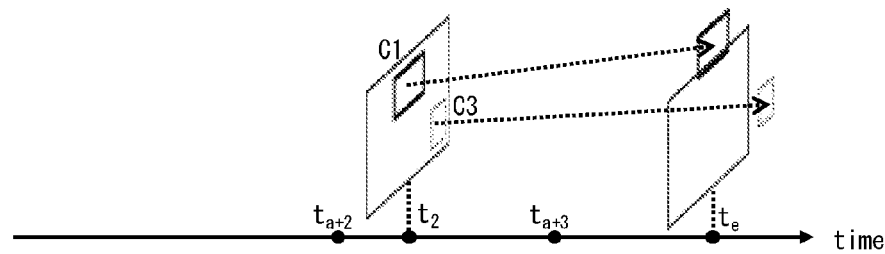

FIG. 10(c) is a diagram showing the positions of the regions C1 and C3 in the image Ia+2 acquired at time ta+2, and the positions of the regions C1 and C3 at time te, which was estimated at time t2. FIG. 10(c) shows a state where, at time te, it is estimated that the region C1 will stray upward from the image capture range of the first camera 121, and the region C3 will stray laterally from the image capture range of the first camera 121.

Explanation is continued by returning to FIG. 9.

Since both the regions C1 and C3 will be outside the image capture range of the first camera 121 at time te, the region future estimation unit 212 determines that the region C1 is also not subject to the calculation of three-dimensional information (step S514). The region future estimation unit 212 records "−1" as the priority of the entry of the region C1 in the object candidate region table 300 (step S515).

Based on this writing by the region future estimation unit 212 in the object candidate region table 300, the processing that was standing by in the loop of steps S520 to S525 pursuant to the series of processing from time ta is determined to be a positive result in step S525, and the processing is thereby ended.

Since the calculation has been started regarding the entry of the region C1 (step S517: NO), and the entry is not subject to the calculation of the three-dimensional information but the three-dimensional information is currently being calculated (step S526: YES), the information processing device 125 outputs a calculation interruption command to the three-dimensional information calculation unit 215 (step S527).

(Series of Processing from Time ta+3)

At time ta+3 after a predetermined time has elapsed from time ta+2, the first image input unit 121A imports the image Ia+3 (step S501). The region tracking unit 213 performs processing for tacking the region C1 (steps S503 to 506).

The region future estimation unit 212 starts the calculation at time t3, and, since the scheduled calculation end time te has not been recorded (step S510: YES), time tc2 is calculated. Subsequently, region future estimation unit 212 estimates the status of the region C1 having an entry in the object candidate region table 300 after time tc2 has elapsed from the current time. Since the preceding vehicle decelerated immediately after time ta+2, the region C1 returns from the upper part to the center in the image Ia+3. Consequently, the region future estimation unit 212 estimates that the region C1 exists within the image capture range of the first camera 121 after time tc2 has elapsed from the current time.

Figure 10D:
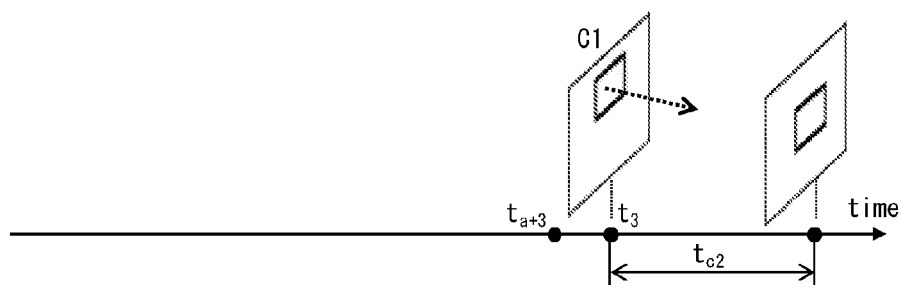

FIG. 10(d) is a diagram showing the position of the region C1 in the image Ia+3 acquired at time ta+3, and the position of the region C1 after the lapse of time tc2 from current time ta+3, which was estimated at time t3. FIG. 10(d) shows a state where, after time tc2 has elapsed from the current time, it is estimated that the region C1 exists within the image capture range of the first camera 121.

Explanation is continued by returning to FIG. 9.

The processing target selection unit 214 once again determines that the three-dimensional information should be calculated for the region C1 which will still remain within the image capture range of the first camera 121 even after the lapse of time tc2 from the current time (step S514). The processing target selection unit 214 records, in the entry of the region C1 of the object candidate region table 300, that the entry is subject to the calculation of three-dimensional information and that the calculation has not yet been started.

Since the region C1 is subject to the calculation of three-dimensional information and the calculation has not yet been started (step S517: YES), the information processing device 125 instructs the three-dimensional information calculation unit 215 to start the calculation of the three-dimensional information (step S518). In other words, the calculation of the three-dimensional information of the region C1, which was once discontinued, is resumed.

It is thereby possible to re-estimate the future status of the object candidate region while the three-dimensional information of the object candidate region is being calculated, and, consequently, it is possible to continue calculating the three-dimensional information of only the regions that are estimated to be within the screen. As a result, it is possible to inhibit the calculation processing of unneeded three-dimensional information, and thereby reduce the processing time for detecting objects. Moreover, it is possible to re-estimate the future status while the three-dimensional information is being calculated, and, consequently, it is possible to discontinue the calculation processing of three-dimensional information of the object candidate regions that are estimated to be outside the screen. As a result, it is possible to inhibit the calculation processing of unneeded three-dimensional information, and thereby reduce the processing time for detecting objects.

Moreover, by tracking an object candidate region which was determined that three-dimensional information should not be calculated, when it is subsequently estimated that the future status of such object candidate region will be within the screen, it will be possible to execute the calculation processing of three-dimensional information by using the latest object candidate region, and this will improve the object detection performance.

The following effects are yielded according to the first embodiment described above.

(1) The object detection device 100 includes a first image input unit 121A which continuously acquires a plurality of images from a first camera 121, and a second image input unit 122A which continuously acquires a plurality of images from a second camera 122. The object detection device 100 additionally includes an object candidate region extraction unit 211 which extracts an object candidate region where an object exists by using two or more images acquired by the first image input unit 121A at different times, and a region future estimation unit 212 which estimates a future position of the object candidate region relative to an image capture range of the first imaging unit based on a position of the extracted object candidate region on a plurality of images. The object detection device 100 additionally includes a processing target selection unit 214 which determines whether or not three-dimensional information should be calculated for each of the object candidate regions based on the future position estimated by the region future estimation unit 212, and a three-dimensional information calculation unit 215 which calculates three-dimensional information of the object candidate region, in which three-dimensional information is deemed required by the processing target selection unit 214, based on a baseline length of the first imaging unit and the second imaging unit by using the imaged acquired by the first image input unit and the second image input unit.

As a result of configuring the object detection device 100 in the manner described above, whether or not to calculate the three-dimensional information of the object candidate region is determined based on the position of the object candidate region after a predetermined time; for instance, at the time that the calculation of the three-dimensional information is completed, and, therefore, it is possible to reduce the time required for calculating the three-dimensional information, and thereby speed up the processing.

(2) The processing target selection unit 214 determines that three-dimensional information should be calculated when it is determined that the object candidate region estimated by the region future estimation unit 212 is included in an image capture range of the first camera 121, and determines that three-dimensional information should not be calculated when it is determined that the object candidate region estimated by the region future estimation unit 212 is not included in an image capture range of the first camera 121.

Consequently, by extracting an object candidate region from the images captured by a camera, estimating the future status of the extracted object candidate region, determining that the calculation of three-dimensional information is required when the estimated status is within an image capture range of the camera, and calculating the three-dimensional information of only the object candidate regions determined that three-dimensional information should be calculated, it is possible to inhibit the calculation processing of unneeded three-dimensional information, and thereby reduce the processing time for detecting objects.

(3) While the three-dimensional information calculation unit 215 is calculating three-dimensional information of the object candidate region, if the processing target selection unit 214 determines that three-dimensional information of that object candidate region should not be calculated, the three-dimensional information calculation unit 215 discontinues the calculation of the three-dimensional information.

Consequently, it is possible to adopt a configuration where the three-dimensional information calculation processing is discontinued in cases where the future status of the object candidate region, which is undergoing the three-dimensional information calculation processing, is estimated before the foregoing processing is completed, and it is determined that the estimated status is outside the image capture range of the first camera 121. It is thereby possible to inhibit the calculation processing of unneeded three-dimensional information, and thereby reduce the processing time for detecting objects.

(4) When the processing target selection unit 214 determines that three-dimensional information of the object candidate region should not be calculated and thereafter determines that three-dimensional information of the object candidate region should be calculated, the three-dimensional information calculation unit 215 calculates three-dimensional information of that object candidate region.

Consequently, by estimating the future status of the object candidate region, which was determined that three-dimensional information should not be calculated, after the lapse of a predetermined time, and executing the three-dimensional information calculation processing when it is determined that the estimated status is within the image capture range of the first camera 121, it is possible to inhibit the calculation processing of unneeded three-dimensional information, and thereby reduce the processing time for detecting objects.

The first embodiment described above may also be modified as follows.

(1) In the first embodiment, while the object candidate region was extracting the optical flow in pixel units by using two images at different image capture times, it is also possible to perform processing only for specific parts of the region as described below in order to reduce the processing time. In other words, it is also possible to detect the pixels of edges from one image, extract edge segments by connecting the detected edge pixels in the vertical direction or the horizontal direction, calculate the two-dimensional optical flow of only the pixels of the upper end and the lower end of the obtained edge segments, calculate the possibility of the existence of an object from the calculated optical flow, combine the edge segments where an object exists with a high probability, and use the combined edge segments as the object candidate region.

(2) In the first embodiment, while the scheduled calculation end time te and the required calculation time tc had a common value irrespective of the object candidate region, the scheduled calculation end time te and the required calculation time tc may be given values for each object candidate region. In the foregoing case, the processing time required for calculating the three-dimensional information of each object candidate region shall be required calculation time tc.

(3) While the priority of the object candidate region was determined only based on the area, the method of determining the priority is not limited thereto. For instance, by giving consideration to the position of the object candidate region, the priority of the object candidate region may be increased for the object candidate region that is positioned closer to the center or the image, or the priority may be determined by combining the position and the size of the area of the object candidate region. Moreover, it is also possible to analyze the footage of past travels and learn the relationship of the size and position of the object candidate region and the actual object, and determine the priority based on such relationship.

(4) The object detection device 100 may also be provided independently from the autonomous mobile device 1. In other words, the object detection device 100 may additionally include a communication which communicates with the transmission/reception device 126 of the autonomous mobile device 1, and yield the same effects as the first embodiment by communicating with the transmission/reception device 126. In other words, the object detection device 100 may acquire images from the first camera 121 and the second camera 122, and acquire information from the internal measurement device 129 and the external measurement device 128 via the transmission/reception device 126. Furthermore, the calculation results of the object detection device 100 may be output to the mechanism control unit 123 via the transmission/reception device 126.

(5) While the autonomous mobile device 1 travels along the travel path stored in the storage device 127, the autonomous mobile device 1 may also include a travel path change unit which re-sets the travel path based on the output of the object detection device 100.

(6) The autonomous mobile device 1 may also avoid obstacles based on three-dimensional information calculated by the three-dimensional information calculation unit 215 without comprising the object position identifying unit 216.

(Second Embodiment)

The second embodiment of the object detection device and the autonomous mobile device according to the present invention is now explained with reference to FIG. 11 to FIG. 18. In the ensuing explanation, the same constituent elements as the first embodiment are given the same reference numeral, and only the differences will be mainly explained. Points that are not specifically explained are the same as the first embodiment. This embodiment primarily differs from the first embodiment with regard to the point that a region that is a shadow of an object relative to the object candidate region for which three-dimensional information was calculated is estimated, and the three-dimensional information is re-calculated using the image obtained by being captured when the mobile object moves to the position where the three-dimensional information of that region can be calculated.

The configuration of the object detection device 100 according to the second embodiment of the present invention mainly differs from the first embodiment with respect to the point that the object detection unit 201 additionally includes a three-dimensional information management unit 311, and the point that the configuration of the object candidate region table 300 stored in the main storage unit 132 of the information processing device 125 is different.

Figure 11:
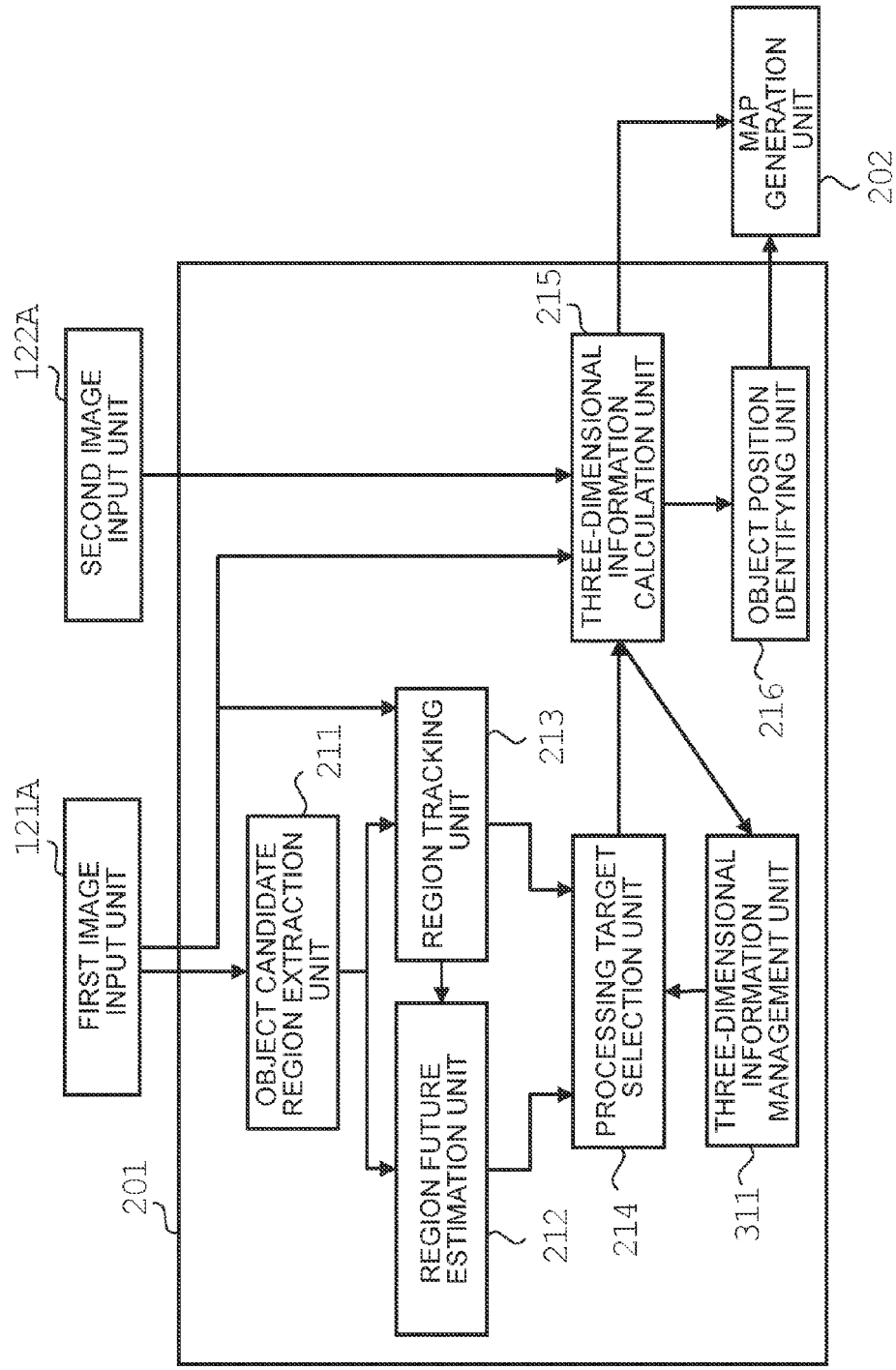
FIG. 11 is a block diagram showing a configuration of an object detection unit 201 in the second embodiment.

FIG. 11 is a block diagram showing a configuration of the object detection unit 201 in the second embodiment of the present invention. The three-dimensional information management unit 311 provided in the object detection unit 201 acquires information from the three-dimensional information calculation unit 215 and the object position identifying unit 216, and outputs the arithmetic results to the processing target selection unit 214.

The three-dimensional information management unit 311 acquires the three-dimensional information of each object candidate region from the three-dimensional information calculation unit 215, and thereby acquires the position of the objects from the object position identifying unit 216. The three-dimensional information management unit 311 uses the foregoing information to identify a space where three-dimensional information has not been calculated within the space around the object candidate region for which the three-dimensional information was calculated by the three-dimensional information calculation unit. When there is a space where three-dimensional information has not been calculated, the three-dimensional information management unit 311 calculates a range on a path where such space in which three-dimensional information has not been calculated is visible, and stores the calculated range, together with the foregoing determination result, in the object candidate region table 300.

FIG. 12 is a diagram showing an example of a configuration of the object candidate region table 300 in the second embodiment. The object candidate region table 300 in the second embodiment is configured by adding the two items of a three-dimensional information re-calculation target and a re-calculation range to the object candidate region table 300 in the first embodiment.

The three-dimensional information re-calculation target of the object candidate region table 300 stores a flag representing that there is a space where three-dimensional information has not been obtained around the object candidate region of the corresponding entry, and whether or not the three-dimensional information of that space should be re-calculated. For instance, in the example of FIG. 12, "Y" is indicated to show that re-calculation should be performed and "N" is indicated to show that re-calculation should not be performed. The value of the three-dimensional information re-calculation target is recorded by the three-dimensional information management unit 311.

The re-calculation range of the object candidate region table 300 stores a range on the travel path for acquiring images to be used in the re-calculation of the three-dimensional information. The range of the travel path is recorded by using the map coordinates stored in the storage device 127. In other words, acquired are images to be used in the re-calculation within a range of a distance R centered around specific positions (X, Y) represented with the map coordinates. For example, in the example of FIG. 12, the range of the specific positions (X, Y) and the distance R is indicated in the format of (X, Y, R). The re-calculation range is recorded by the three-dimensional information management unit 311.

The processing target selection unit 214 uses the external measurement device 128 to acquire the self-location of the autonomous mobile device 1 in addition to performing the processing of the first embodiment. The processing target selection unit 214 extracts, among the entries stored in the object candidate region table 300, an entry in which the value of the three-dimensional information re-calculation target is Y; that is, an entry which is subject to the re-calculation of three-dimensional information and in which the object candidate region is within the re-calculation range. The processing target selection unit 214 rewrites the priority of the extracted object candidate region to be a value that is higher than the value representing the three-dimensional information calculation target, and rewrites the execution status of the three-dimensional information calculation to a value representing a non-executed status.

(Flowchart of Beginning Part)

In the first embodiment, while the program in which the operation is indicated in FIG. 6 and FIG. 7 was executed at predetermined time intervals that the first camera 121 and the second camera 122 capture images, the program is constantly executed in the second embodiment. Moreover, as described below, a step to be executed immediately before step S501 of FIG. 6 and a step to be executed immediately after step S521 of FIG. 7 have been added.

Figure 13:
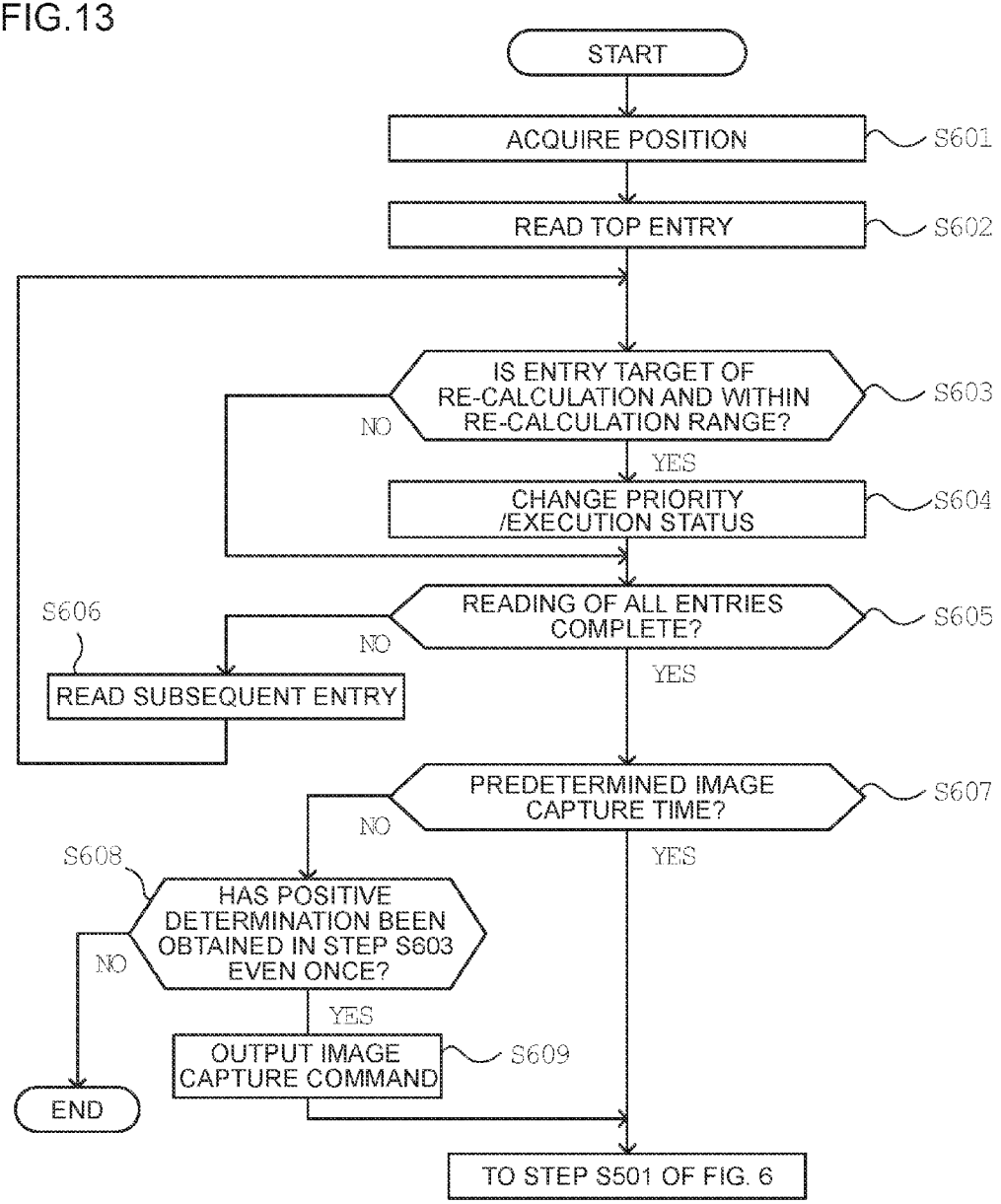
FIG. 13 is a flowchart showing the processing to be executed immediately before step S501 of FIG. 6.

FIG. 13 is a flowchart showing the processing to be executed immediately before step S501 of FIG. 6. As described above, the flowchart shown in FIG. 13 is constantly executed. The execution agent of this flowchart explained below is the CPU 131 of the information processing device 125.

In step S601, the information processing device 125 uses the external measurement device 128 to acquire the position of the autonomous mobile device 1, and then proceeds to step S602.

In step S602, the information processing device 125 reads the top entry of the object candidate region table 300, and then proceeds to step S603.

In step S603, the information processing device 125 determines whether or not the read entry satisfies both of the following two conditions; that is, (1) the entry is subject to re-calculation, and (2) the position acquired in step S601 is included within the re-calculation range. The information processing device 125 proceeds to step S604 upon determining that the two conditions are satisfied, and proceeds to step S605 upon determining that at least one of the conditions is not satisfied.

In step S604, the information processing device 125 changes the priority of the corresponding entry to a value, such as a positive value, that is higher than the value representing the three-dimensional information calculation target, and changes the execution status to a value representing a non-executed status, such as "WAIT", and then proceeds to step S605.

In step S605, the information processing device 125 determines whether or not all entries of the object candidate region table 300 have been read. The information processing device 125 proceeds to step S607 upon determining that all entries have been read, and proceeds to step S606 upon determining that at least one of the entries has not been read.

In step S606, the information processing device 125 reads the subsequent entry from the object candidate region table 300, and then returns to step S603.

In step S607, the information processing device 125 determines whether it is a predetermined time for the first camera 121 and the second camera 122 to capture images. The information processing device 125 proceeds to step S501 of FIG. 6 upon determining that it is a predetermined time; for instance, that it is time ta, ta+1 or the like, and proceeds to step S608 upon determining that it is not a predetermined time. In step S608, the information processing device 125 determines whether a positive result was obtained even once in the determination of step S603. The information processing device 125 proceeds to step S609 upon determining that a positive result was obtained even once in the foregoing determination, and proceeds to step S608 upon determining that only negative results were obtained in the foregoing determination.

In step S609, the information processing device 125 sends an image capture command to the first camera 121 and the second camera 122, and then proceeds to step S501 of FIG. 6.

(Flowchart of Re-calculation Determination)

Figure 14:
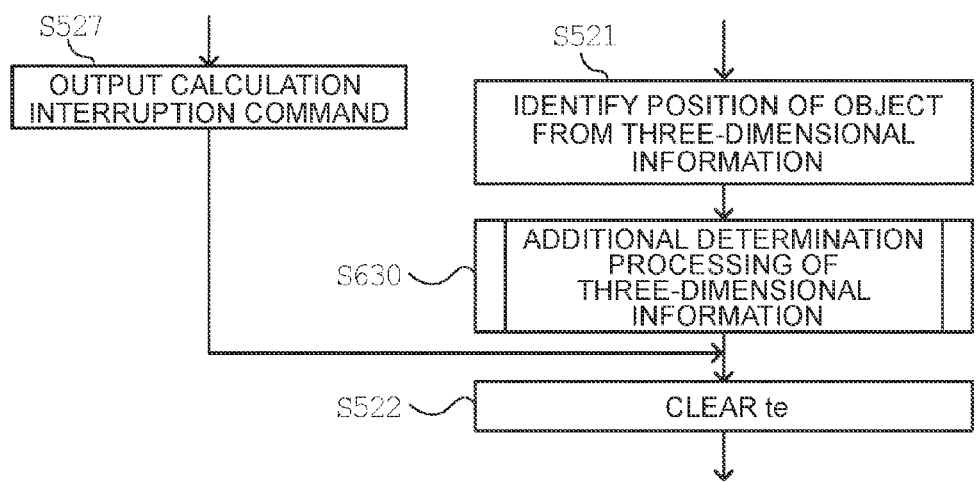
FIG. 14 is a flowchart showing the changes near step S521 of the flowchart of FIG. 7.

FIG. 14 is a flowchart showing the changes near step S521 of the flowchart of FIG. 7 in the first embodiment.

The processing up to step S521 is the same as the first embodiment other than the point that the foregoing processing of FIG. 13 is added.

In step S521, the information processing device 125 uses the object position identifying unit 216 to identify the position of the object, outputs the information thereof to the map generation unit 202, and then proceeds to step S630.

In step S630, the information processing device 125 uses the three-dimensional information management unit 311 to perform the following additional determination processing of three-dimensional information. The information processing device 125 acquires the three-dimensional information of each object candidate region from the three-dimensional information calculation unit 215, acquires the position of the object from the object position identifying unit 216, and identifies a space where three-dimensional information has not been calculated within the space around the object. When there is a space where three-dimensional information has not been calculated, the information processing device 125 calculates a range on a path where such space in which three-dimensional information has not been calculated is visible, stores the calculated range, together with the foregoing determination result, in the object candidate region table 300, and then proceeds to step S522.

In step S527, the information processing device 125 outputs a calculation interruption command to the three-dimensional information calculation unit 215, and then proceeds to step S522.

The processing of step S522 onward is the same as the first embodiment.

Figure 15:
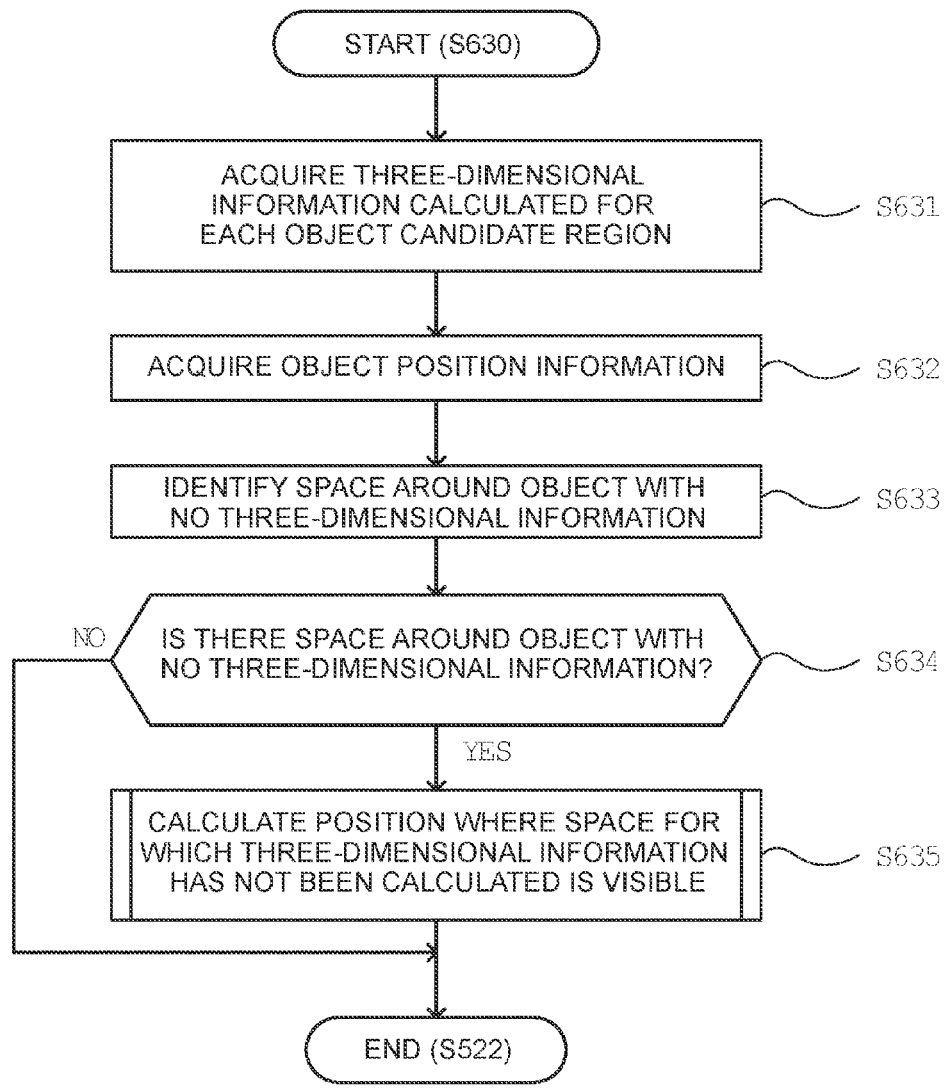
FIG. 15 is a flowchart showing a detailed operation of the additional determination of three-dimensional information.

FIG. 15 is a flowchart showing a detailed operation of the additional determination of three-dimensional information in step S630.

In step S631, the information processing device 125 acquires the three-dimensional information of each object candidate region from the three-dimensional information calculation unit 215, and then proceeds to step S632.

In step S632, the information processing device 125 acquires the position of the object from the object position identifying unit 216, and then proceeds to step S633.

In step S633, the information processing device 125 projects the obtained three-dimensional information and the object position on a two-dimensional overhead view map, identifies a space adjacent to the object where three-dimensional information has not been obtained, and the proceeds to step S634. The processing of step S633 will be described in detail later.

In step S634, the information processing device 125 determines whether there is a space where three-dimensional information has not been obtained. The information processing device 125 proceeds to step S635 upon determining that there is a space where three-dimensional information has not been obtained, and ends the execution of the flowchart shown in FIG. 15 and proceeds to step S522 of FIG. 6 upon determining that there is no space where three-dimensional information has not been obtained.

In step S635, the information processing device 125 calculates a position where a space in which three-dimensional information has not been obtained is visible; that is, a position where three-dimensional information, which is not currently obtained, can be obtained by using the images captured from such position, and then proceeds to step S522 of FIG. 6. The processing of step S635 will be described in detail later with reference to a flowchart.

(Identification of Space for which Three-dimensional Information has not Yet been Obtained)

Figure 16:
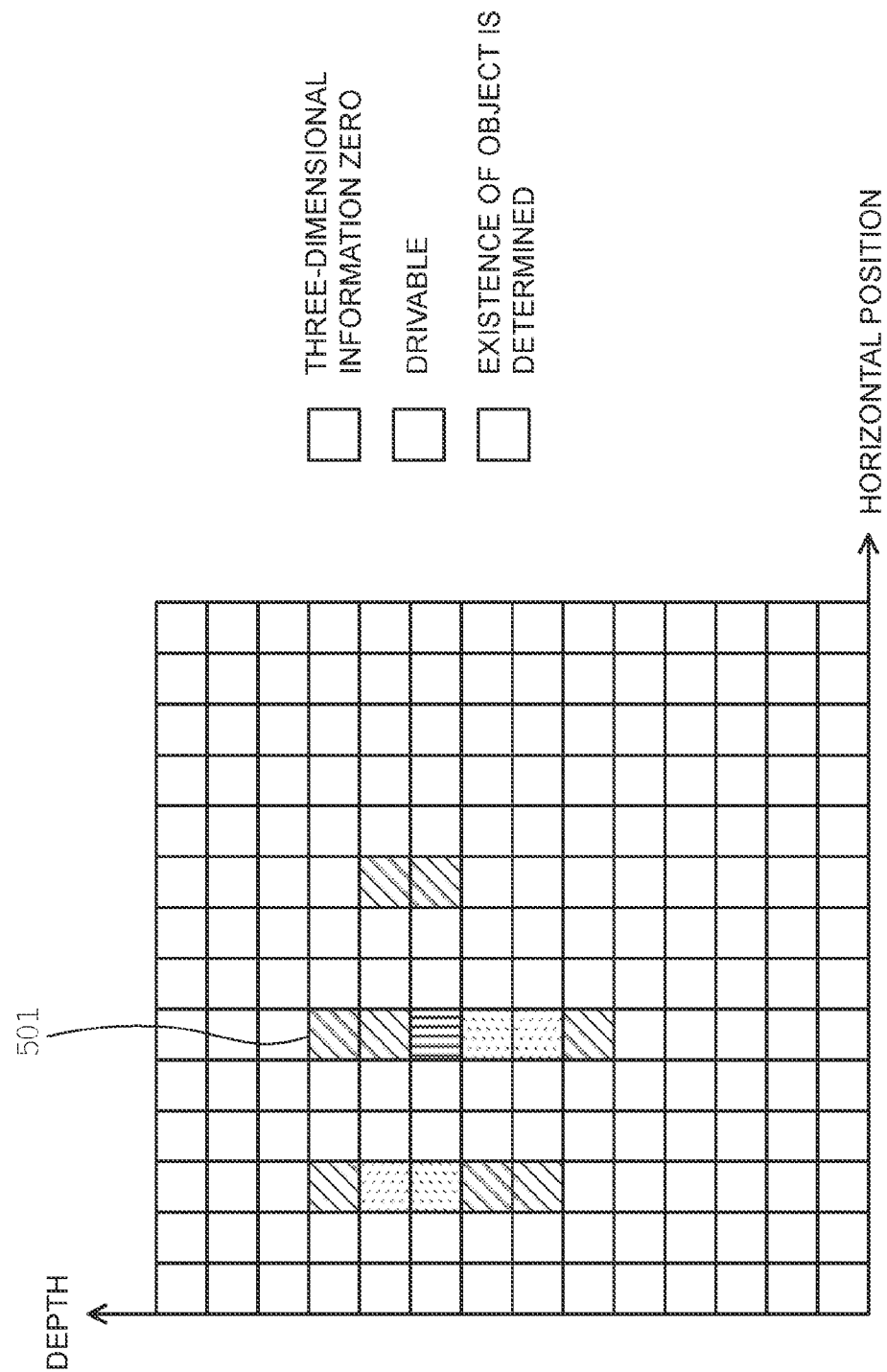
FIG. 16 is a two-dimensional overhead view map explaining the space for which three-dimensional information has not yet been obtained.

FIG. 16 is an example of a two-dimensional overhead view map explaining the processing of step S633.

FIG. 16 shows an example where three-dimensional information is mapped in a certain object candidate region. The horizontal axis of the two-dimensional overhead view map shown in FIG. 16 is the horizontal position of the autonomous mobile device 1, and the vertical axis is the forward direction of the autonomous mobile device 1. The autonomous mobile device 1 captured an image from the lower center to the upper part of FIG. 16. In the two-dimensional overhead view map, the horizontal position and the forward direction of the three-dimensional information calculated for the respective pixels in the object candidate region are mapped in the respective grids. In the two-dimensional overhead view map, the grids in which three-dimensional information of a predetermined height or higher was calculated; that is, the grids determined to contain an object are represented via vertical line hatching. In the two-dimensional overhead view map, the grids in which three-dimensional information of less than a predetermined height was calculated are represented via dotted hatching. In the two-dimensional overhead view map, the grids where three-dimensional information could not be obtained are represented as being empty; that is, as white. In the two-dimensional overhead view map, the grids where three-dimensional information could not be obtained and which are adjacent to a grid where some kind of three-dimensional information was obtained are represented via diagonal line hatching.

As reasons that three-dimensional information of a certain grid cannot be obtained, the following three reasons are assumed; specifically, (1) shadow of an object, (2) not subject to calculation, or (3) information is discrete because the distance of the object is far. Reason (1) "shadow of an object" is a status where three-dimensional information cannot be calculated because, since there is some kind of object in front, the image behind that object cannot be captured. Reason (2) "not subject to calculation" is a status where, as explained in the first embodiment, since the object detection device 100 only calculates the three-dimensional information of an object candidate region, the grid was not determined to be an object candidate region and the three-dimensional information was consequently not calculated. Reason (3) "information is discrete because the distance of the object is far" is a status where three-dimensional information cannot be obtained because the resolution of information becomes coarse as the distance becomes farther due to the characteristics of the optical system.

Even if attention is given only to the grids where three-dimensional information could not be obtained, it is not possible to determine the foregoing reasons (1) to (3). Thus, in this embodiment, grids that are adjacent to the grids determined to contain an object are extracted in order to extract the grids corresponding to "(1) shadow of an object". In other words, a region 501 in FIG. 16 is identified as the space where three-dimensional information has not been obtained.

(Calculation Flowchart of Visible Position)

Figure 17:
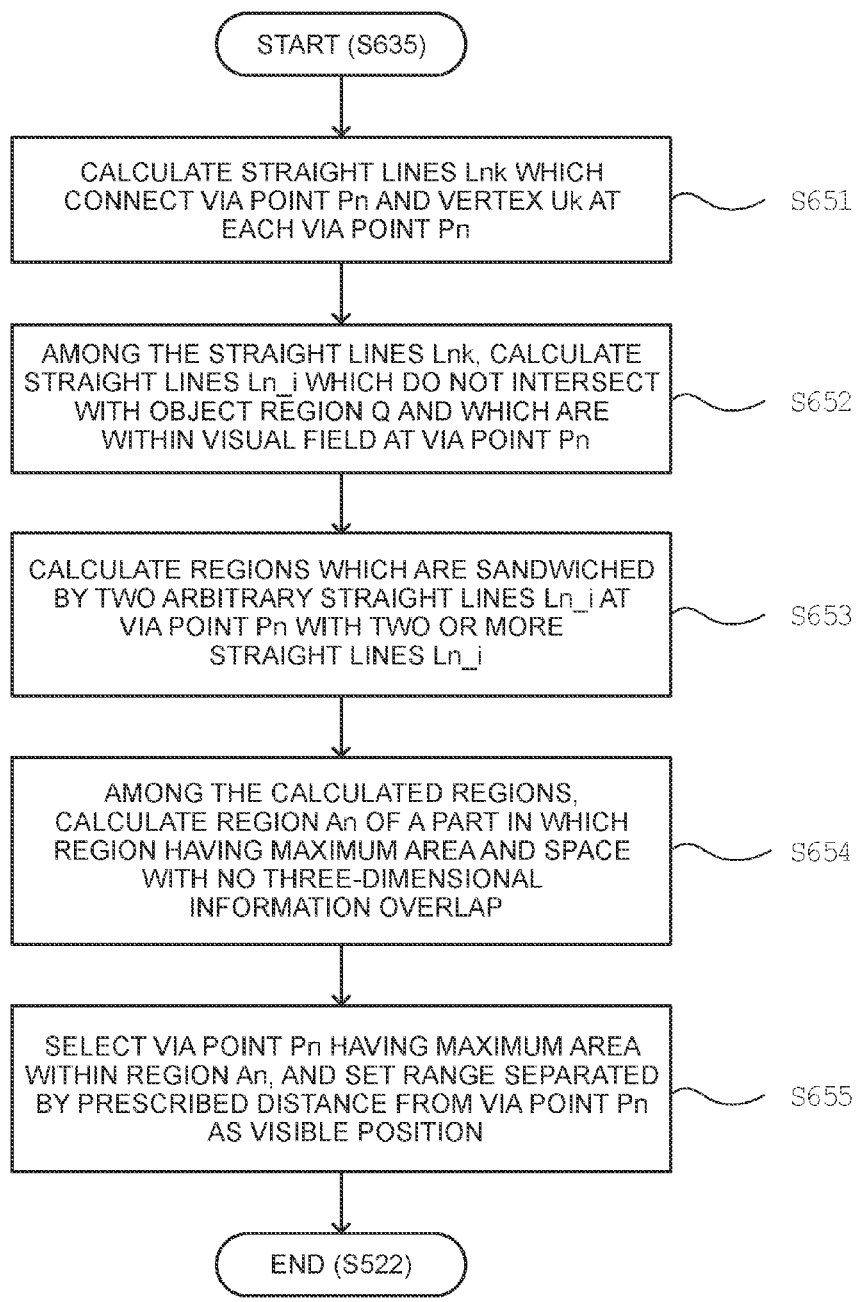
FIG. 17 is a flowchart for calculating a visible position.

FIG. 17 is a flowchart for calculating the visible position of a space with no three-dimensional information; that is, a flowchart showing a detailed operation of step S635 of the flowchart shown in FIG. 15.

In step S651, the information processing device 125 calculates straight lines Lnk (k=0, . . . , L−1) connecting a via point Pn and L-number of vertexes Uk (k=0, . . . , L−1) of the space with no three-dimensional information with regard to each of the N-number of via points Pn (n=0, . . . , N−1) on a pre-set travel path, and then proceeds to step S652. In step S652, the information processing device 125 extracts straight lines among the straight lines Lnk calculated in step S651 which do not intersect with an object region Q and which are within a visual field at the via point Pn, and assigns an alias of straight line Ln_i to those straight lines. "i" in the straight line Ln_i shall be a sequential number from zero. The information processing device 125 subsequently proceeds to step S653.

In step S653, the information processing device 125 calculates a region which is sandwiched by two arbitrary straight lines with regard to the via point Pn with two or more straight lines Ln_i, and then proceeds to step S654.

In step S654, the information processing device 125 calculates, for each via point, a region of a part where the region with the largest area among the regions calculated in step S653 and the space with no three-dimensional information overlap, and then proceeds to step S655.

In step S655, the information processing device 125 compares the areas of the regions at all via points, and causes the via point with the largest area to be the visible position of the space with no three-dimensional information. The information processing device 125 then proceeds to step S522 of FIG. 7.

(Calculation Example of Visible Position)

Figure 18A:
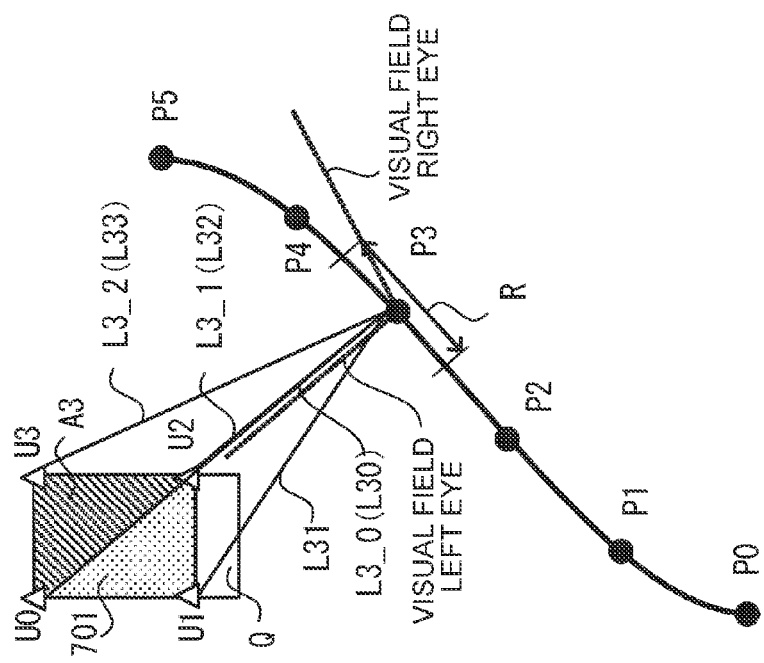
FIGS. 18A-18B are diagrams explaining a calculation example of the visible position.
Figure 18B:
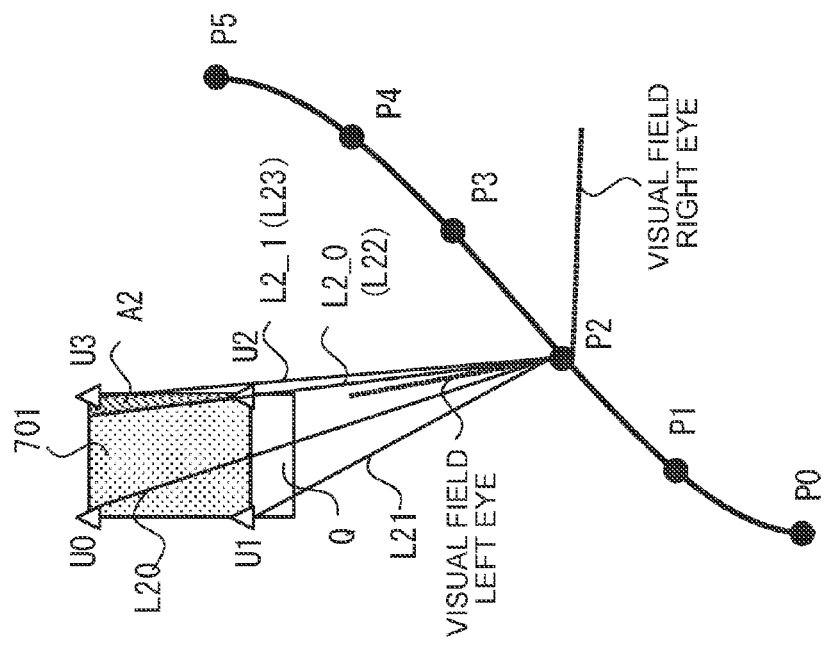

A calculation example of the visible position is now explained with reference to the drawings. FIG. 18 is a diagram showing the positional relationship of the visual fields of the first camera 121 and the second camera 122 at the via points P2 and P3 on a pre-set travel path of the autonomous mobile device 1, and a detected object Q. A region 701 shown via hatching is the space where no three-dimensional information has been obtained.

The information processing device 125 calculates straight lines L20, L21, L22, L23, L30, L31, L32, L33 that connect the via points and the four vertexes Uk (k=0 to 3) of the space with no three-dimensional information at the via points P2 and P3 (step S651). The information processing device 125 extracts L22, L23, L30, L32, L33 as the straight lines which do not intersect with the object region Q and which are within the visual field at the via point Pn. The information processing device 125 assigns an alias of L2_0, L2_1, L3_0, L3_1, L3_2 to the extracted straight lines (step S652). The information processing device 125 extracts the region A2 which is sandwiched by L2_0 and L2_1 at the via point P2, extracts a region A30 which is sandwiched by L3_0 and L3_1 and extracts a region A31 sandwiched by L3_1 and L3_2 at the via point P3 (step S653). The information processing device 125 calculates the area of the region A2 at the via point P2, and calculates the area of the region A31 at the via point P3 (step S654). Since the region A30 has the largest area, the information processing device 125 sets a range R that is separated from the via point P3 by a predetermined distance as the visible position.

The following effects are yielded according to the second embodiment described above.

(1) The object detection device 100 includes a region tracking unit 213 which sequentially tracks the object candidate region. The processing target selection unit 214 determines that three-dimensional information of the object candidate region being tracked by the region tracking unit 213 should not be calculated when the three-dimensional information calculation unit 215 completes calculating three-dimensional information of that object candidate region, and, when it is determined that three-dimensional information of the object candidate region is additionally required, determines that three-dimensional information of that object candidate region should be calculated at a pre-determined timing.

Consequently, when three-dimensional information of a certain object candidate region is calculated, by not re-calculating the three-dimensional information of the same object candidate region, it is possible to reduce the processing time for detecting objects. Furthermore, when it is determined that there is a region as a shadow of an object and that three-dimensional information is additionally required, it is determined that three-dimensional information should be calculated at a predetermined timing, and the three-dimensional information is re-calculated. In other words, the three-dimensional information can be re-calculated as needed.

(2) The object detection device 100 includes a position acquisition unit which acquires the positions of the first camera 121 and the second camera 122, and a three-dimensional information management unit which, when the processing target selection unit 214 determines that three-dimensional information of the object candidate region is additionally required, acquires the positions from the position acquisition unit, and, when the space adjacent to the corresponding object candidate region where three-dimensional information was not calculated reaches a position where images can be captured by the first camera 121 and the second camera 122, causes the processing target selection unit 214 to determine that the three-dimensional information of the corresponding object candidate region should be calculated.

In other words, when there is space in which three-dimensional information could not be obtained, a range on a path where the image of that space is to be captured is calculated, and three-dimensional information of the object candidate region being tracked when the mobile object reached the calculated range is calculated. Consequently, it is possible to acquire, more accurately, the three-dimensional information of objects required for autonomous travel while suppressing calculation costs.

(Third Embodiment)

The third embodiment of the object detection device and the autonomous mobile device according to the present invention is now explained with reference to FIG. 19 and FIG. 20. In the ensuing explanation, the same constituent elements as the first embodiment are given the same reference numeral, and only the differences will be mainly explained. Points that are not specifically explained are the same as the first embodiment. This embodiment primarily differs from the first embodiment with regard to the point of comprising a total of three cameras; specifically, one camera for capturing images for use in extracting and tracking the object candidate regions, and two cameras for capturing images for use in calculating the three-dimensional information.

The configuration of the autonomous mobile device according to the third embodiment further includes a third camera, a third image input unit, and a corresponding region calculation unit in addition to the configuration of the first embodiment.

Figure 19:
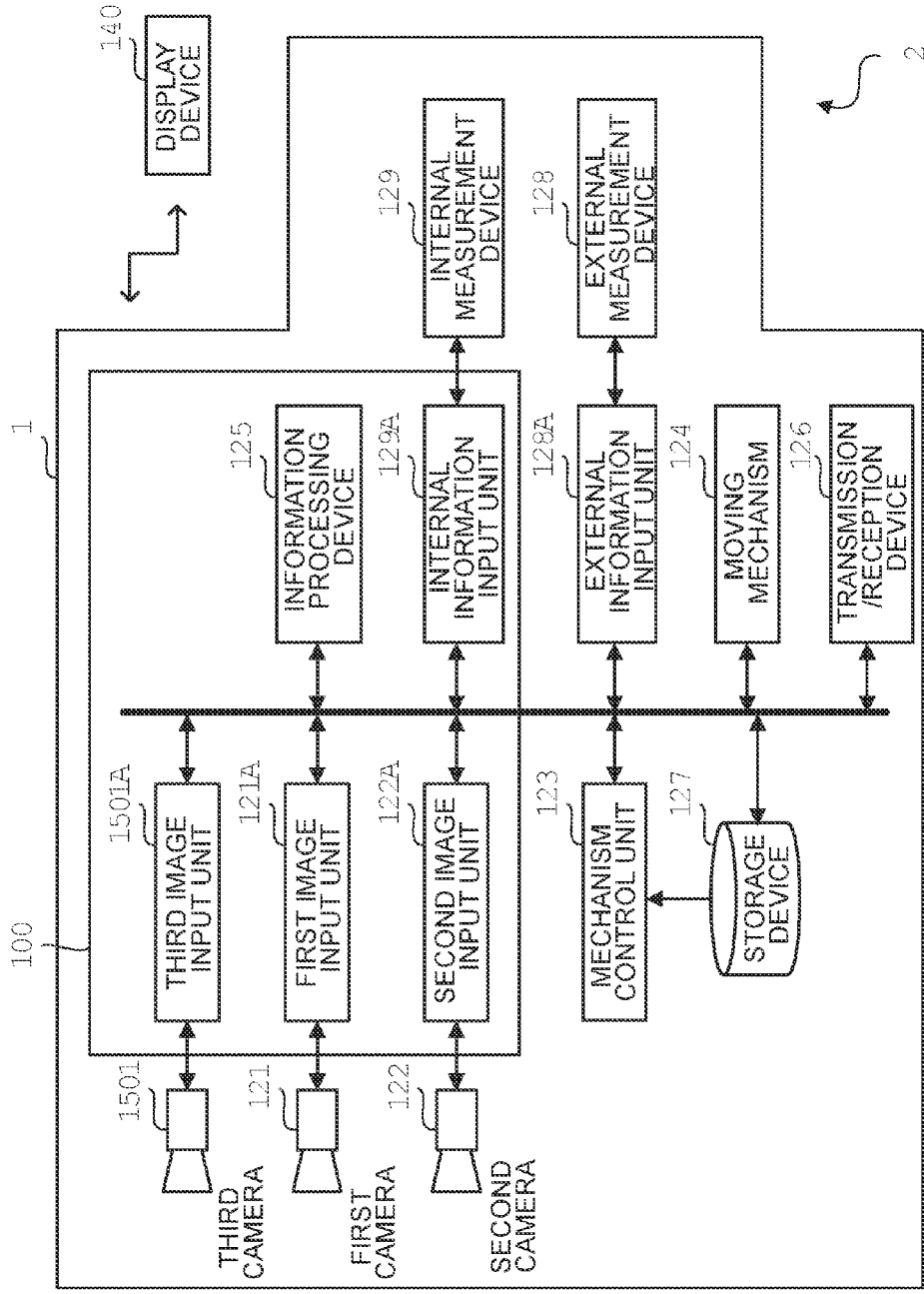
FIG. 19 is a block diagram showing a configuration of an autonomous mobile system according to the third embodiment.

FIG. 19 is a block diagram showing a configuration of the autonomous mobile system 2 according to the third embodiment. A third camera 1501 is connected to a bus of the autonomous mobile device 1 via a third image input unit 1501A.

The first camera 121 has a higher frame rate than the second camera 122 and the third camera 1501. The second camera 122 and the third camera 1501 are cameras with a higher resolution than the first camera.

Figure 20:
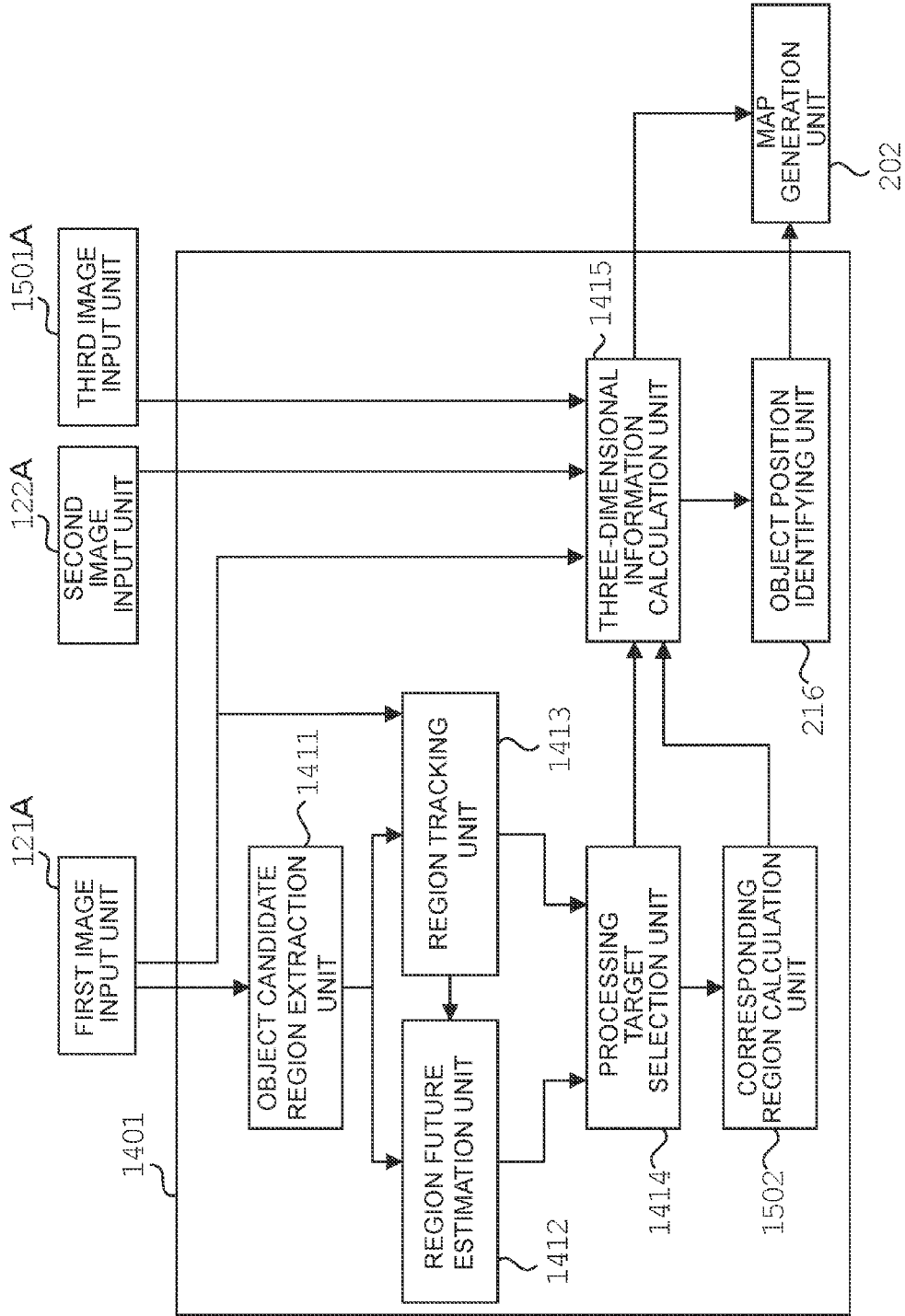
FIG. 20 is a block diagram showing a functional configuration of an object detection unit according to the third embodiment.

FIG. 20 is a block diagram showing a functional configuration of the object detection unit 201 according to the third embodiment. The object detection unit 201 includes a corresponding region calculation unit 1502 in addition to the configuration of the first embodiment.

The operation of the corresponding region calculation unit 1502 is as follows. The corresponding region calculation unit 1502 sequentially extracts entries from the object candidate region table 300, and performs the following processing when the value of the three-dimensional information calculation priority is a value which indicates a three-dimensional calculation target (for instance, a positive value). The corresponding region calculation unit 1502 calculates the object candidate region represented with the region vertex coordinates in the image acquired by the first camera 121 as the corresponding region in the image acquired from the second camera 122 or the third camera 1501. The corresponding region calculation unit 1502 updates the vertex coordinates of the calculated region as the region vertex coordinates in the corresponding entry of the object candidate region table 300. As the method of calculating the corresponding region, for instance, with the image of the object candidate region in the image acquired from the first camera 121 as the template, the overall image acquired from the second camera 122 or the third camera 1501 is searched, and the position with the closet distance is deemed to be the corresponding region.

The three-dimensional information calculation unit 215 extracts the entry of the object candidate region from the object candidate region table 300, and, when the value of the three-dimensional information calculation priority is a value which indicates a three-dimensional calculation target (for instance, a positive value), calculates the three-dimensional information corresponding to the respective pixels in the object candidate region based on the corresponding point search processing between the first image acquired by the third camera 1501 and the second image acquired by the second camera 122. Once the three-dimensional information calculation unit 215 starts the processing, the three-dimensional information calculation unit 215 records a value representing the execution status as the three-dimensional information calculation execution status in the corresponding entry of the object candidate region table 300, and records a value indicating the end of execution after the processing is complete.

The following effects are yielded according to the third embodiment described above.

(1) The three-dimensional information calculation device 215 additionally includes a third image input unit which continuously acquires a plurality of images from a third imaging unit, the first camera 121 captures images at a higher frame rate than the second camera 122 and the third imaging unit, the second camera 122 and the third imaging unit capture images at a higher resolution than the first camera 121, and the three-dimensional information calculation unit 215 calculates three-dimensional information of the object candidate region, in which three-dimensional information is deemed required based on the future position estimated by the region future estimation unit 214, based on the baseline length of the second camera 122 and the third imaging unit by using the images acquired by the second image input unit and the third image input unit.

Consequently, since the two-dimensional optical flow is calculated from the time series images captured by the first camera 121 with a higher frame rate, and the object candidate region is extracted from the calculated two-dimensional optical flow, the two-dimensional optical flow can be calculated with greater precision, and the extraction accuracy of the object candidate region can be improved. Moreover, since the three-dimensional information is calculated from the images captured by the second camera 122 with a higher resolution and the images captured by the third camera 1501 with a higher resolution, highly dense three-dimensional information can be obtained, and the object detection performance can be improved.

Various embodiments and modified examples were explained above, but the present invention is not limited to the contents thereof. Other modes that are considered to be within the scope of the technical concept of the present invention are also covered by the scope of the present invention.

The present invention is not limited to the foregoing embodiments, and also includes various modified examples. The foregoing embodiments were explained in detail for facilitating the understanding of the present invention, and the present invention is not limited to a configuration comprising all of the components explained above. Moreover, a part of the configuration of a certain embodiment may also be replaced with the configuration of another embodiment. Moreover, the configuration of a certain embodiment may also be added to the configuration of another embodiment. Moreover, a part of the configuration of each embodiment may be added with, deleted from, or replaced by another configuration.

(Modified Examples)

In the foregoing embodiments, the object detection unit 201 includes the processing target selection unit 214 and the three-dimensional information calculation unit 215, but the configuration may also be such that the three-dimensional information calculation unit 215 includes the processing target selection unit 214. In other words, the present invention also includes the following configurations.

(1) The object detection device 100 includes a first image input unit 121A which continuously acquires a plurality of images from a first camera 121, and a second image input unit 122A which continuously acquires a plurality of images from a second camera 122. The object detection device 100 additionally includes an object candidate region extraction unit 211 which extracts an object candidate region where an object exists by using two or more images acquired by the first image input unit 121A at different times, and a region future estimation unit 212 which estimates a future position of the object candidate region relative to an image capture range of the first imaging unit based on a position of the extracted object candidate region on a plurality of images. The object detection device 100 additionally includes a three-dimensional information calculation unit 215 which calculates three-dimensional information of the object candidate region, in which three-dimensional information is deemed required based on the future position estimated by the region future estimation unit 212, based on corresponding points of the object candidate region in the images acquired by the first image input unit 121A and the images acquired by the second image input unit 122A.

(2) The three-dimensional information calculation unit 215 includes a processing target selection unit 214 which determines whether or not three-dimensional information should be calculated for each of the object candidate regions based on the future position estimated by the region future estimation unit 212, and the object candidate region in which three-dimensional information is deemed required is the object candidate region in which the processing target selection unit 214 determined that three-dimensional information should be calculated.

A part or all of each of the foregoing configurations, functions, processing units, and processing means may also be realized with hardware, for instance, by designing an integrated circuit. Moreover, each of the foregoing configurations, functions and the like may also be realized with software by a processor interpreting and executing programs which realize the respective functions. Programs, tables, files and other information for realizing the respective functions may be stored in a recording device such as a memory, a hard disk drive, or an SSD (Solid State Drive), or in a recording medium such as an IC card, an SD card, or a DVD.

REFERENCE SIGNS LIST

1 . . . Autonomous mobile device
2 . . . Autonomous mobile system
100 . . . Object detection device
121 . . . First camera
121A . . . First image input unit
122 . . . Second camera
122A . . . Second image input unit
123 . . . Mechanism control unit
124 . . . Moving mechanism
125 . . . Information processing unit
201 . . . Object detection unit
211 . . . Object candidate region extraction unit
212 . . . Region future estimation unit
213 . . . Region tracking unit
214 . . . Processing target selection unit
215 . . . Three-dimensional information calculation unit
216 . . . Object position identifying unit
300 . . . Object candidate region table
311 . . . Three-dimensional information management unit
1501 . . . Third camera
1501A . . . Third image input unit

The invention claimed is:

1. A three-dimensional information calculation device, comprising:
a first image input unit which continuously acquires a plurality of images from a first imaging unit;
a second image input unit which continuously acquires a plurality of images from a second imaging unit;
an object candidate region extraction unit which extracts an object candidate region where an object exists by using two or more images acquired by the first image input unit at different times;
a region future estimation unit which estimates a future position of the object candidate region relative to an image capture range of the first imaging unit based on a position of the extracted object candidate region on a plurality of images; and
a three-dimensional information calculation unit which calculates three-dimensional information of the object candidate region, in which three-dimensional information is deemed required based on the future position estimated by the region future estimation unit, based on corresponding points of the object candidate region in an image included in the images acquired by the first image input unit and an image included in the images acquired by the second image input unit.

2. The three-dimensional information calculation device according to claim 1,
wherein the three-dimensional information calculation unit includes a processing target selection unit which determines whether or not three-dimensional information should be calculated for each of the object candidate regions based on the future position estimated by the region future estimation unit, and
wherein the object candidate region in which three-dimensional information is deemed required is the object candidate region in which the processing target selection unit determined that three-dimensional information should be calculated.

3. The three-dimensional information calculation device according to claim 2, wherein the processing target selection unit determines that three-dimensional information should be calculated when it is determined that the object candidate region estimated by the region future estimation unit is included in an image capture range of the first imaging unit, and determines that three-dimensional information should not be calculated when it is determined that the object candidate region estimated by the region future estimation unit is not included in an image capture range of the first imaging unit.

4. The three-dimensional information calculation device according to claim 2,
wherein, while the three-dimensional information calculation unit is calculating three-dimensional information of the object candidate region, if the processing target selection unit determines that three-dimensional information of that object candidate region should not be calculated, the three-dimensional information calculation unit discontinues the calculation of the three-dimensional information.

5. The three-dimensional information calculation device according to claim 2,
wherein, when the processing target selection unit determines that three-dimensional information of the object candidate region should not be calculated and thereafter determines that three-dimensional information of the object candidate region should be calculated, the three-dimensional information calculation unit calculates three-dimensional information of that object candidate region.

6. The three-dimensional information calculation device according to claim 2, further comprising:
a region tracking unit which sequentially tracks the object candidate region,
wherein the processing target selection unit determines that three-dimensional information of the object candidate region being tracked by the region tracking unit should not be calculated when the three-dimensional information calculation unit completes calculating three-dimensional information of that object candidate region, and, when it is determined that three-dimensional information of the object candidate region is additionally required, determines that three-dimensional information of that object candidate region should be calculated at a predetermined timing.

7. The three-dimensional information calculation device according to claim 1, further comprising:
a third image input unit which continuously acquires a plurality of images from a third imaging unit,
wherein the first imaging unit captures images at a higher frame rate than the second imaging unit and the third imaging unit,
wherein the second imaging unit and the third imaging unit capture images at a higher resolution than the first imaging unit, and
wherein the three-dimensional information calculation unit calculates three-dimensional information of the object candidate region, in which three-dimensional information is deemed required based on the future position estimated by the region future estimation unit, based on corresponding points of the object candidate region in the images acquired by the second image input unit and the images acquired by the third image input unit.

8. An autonomous mobile device, comprising:
the three-dimensional information calculation device according to claim 1;
the first imaging unit;
the second imaging unit;
a moving mechanism equipped with the three-dimensional information calculation device, the first imaging unit, and the second imaging unit; and
a mechanism control unit which controls the moving mechanism based on outputs of the three-dimensional information calculation device.

9. The autonomous mobile device according to claim 8, further comprising:
an object position identifying unit which detects a position of an object based on outputs of the three-dimensional information calculation device,
wherein the mechanism control unit controls the moving mechanism so as to avoid a collision between the object detected by the object position identifying unit and the autonomous mobile device.

10. A three-dimensional information calculation method, comprising the steps of:
continuously acquiring a plurality of images from a first imaging unit;
continuously acquiring a plurality of images from a second imaging unit;
extracting an object candidate region where an object exists by using two or more images acquired by the first image input unit at different times;
estimating a future position of the object candidate region relative to an image capture range of the first imaging unit based on a position of the extracted object candidate region on a plurality of images; and
calculating three-dimensional information of the object candidate region, in which three-dimensional information is deemed required based on the estimated future position, based on corresponding points of the object candidate region in an image included in the images acquired by the first image input unit and an image included in the images acquired by the second image input unit.

11. The three-dimensional information calculation method according to claim 10,
wherein whether or not three-dimensional information should be calculated for each of the object candidate regions is determined based on the estimated future position-of the object candidate region; and
wherein the object candidate region in which three-dimensional information is deemed required is the object candidate region in which it is determined that three-dimensional information should be calculated.

12. The three-dimensional information calculation method according to claim 11,
wherein, with regard to the determination of whether or not three-dimensional information should be calculated for each of the object candidate regions, it is determined that three-dimensional information of the object candidate region should be calculated when it is determined that the object candidate region is included in an image capture range of the first imaging unit after a predetermined time, and it is determined that three-dimensional information of the object candidate region should not be calculated when it is determined that the object candidate region is not included in an image capture range of the first imaging unit after a predetermined time.

13. The three-dimensional information calculation method according to claim 11,
wherein, while three-dimensional information of the object candidate region is being calculated, if it is determined that three-dimensional information of that object candidate region should not be calculated, the calculation of the three-dimensional information is discontinued.

14. The three-dimensional information calculation method according to claim 11,
wherein, when it is determined that three-dimensional information of the object candidate region should not be calculated and it is thereafter determined that three-dimensional information of the object candidate region should be calculated, three-dimensional information of that object candidate region is calculated.

15. The three-dimensional information calculation method according to claim 10, further comprising the step of:
continuously acquiring a plurality of images from a third imaging unit;
wherein the first imaging unit captures images at a higher frame rate than the second imaging unit and the third imaging unit,
wherein the second imaging unit and the third imaging unit capture images at a higher resolution than the first imaging unit, and
wherein three-dimensional information of the object candidate region, in which three-dimensional information is deemed required, is calculated based on a baseline length of the second imaging unit and the third imaging unit by using the images acquired by the second image input unit and the images acquired by the third image input unit.

* * * * *